(12) United States Patent
Wang et al.

(10) Patent No.: US 12,202,229 B2
(45) Date of Patent: Jan. 21, 2025

(54) SUPERHYDROPHOBIC NANOSTRUCTURES

(71) Applicant: Massachusetts Institute of Technology, Cambridge, MA (US)

(72) Inventors: Evelyn Wang, Cambridge, MA (US); Ryan Enright, Whitestone, NY (US); Young Suk Nam, Cambridge, MA (US); Nenad Miljkovic, Cambridge, MA (US)

(73) Assignee: Massachusetts Institute of Technology

( * ) Notice: Subject to any disclaimer, the term of this patent is extended or adjusted under 35 U.S.C. 154(b) by 0 days.

(21) Appl. No.: 13/782,238

(22) Filed: Mar. 1, 2013

(65) Prior Publication Data

US 2013/0244001 A1 Sep. 19, 2013

Related U.S. Application Data

(60) Provisional application No. 61/606,011, filed on Mar. 2, 2012.

(51) Int. Cl.
| | |
|---|---|
| *B32B 15/16* | (2006.01) |
| *C23C 8/42* | (2006.01) |
| *C23C 8/80* | (2006.01) |
| *C23C 30/00* | (2006.01) |

(52) U.S. Cl.
CPC ............. *B32B 15/16* (2013.01); *C23C 8/42* (2013.01); *C23C 8/80* (2013.01); *C23C 30/00* (2013.01); *Y10T 428/24355* (2015.01)

(58) Field of Classification Search
CPC .......... B32B 15/16; C23C 8/80; C23C 30/00; C23C 8/42; Y10T 428/24355
See application file for complete search history.

(56) References Cited

U.S. PATENT DOCUMENTS

| | | | | |
|---|---|---|---|---|
| 2006/0108097 | A1* | 5/2006 | Hodes et al. | 165/80.4 |
| 2009/0010870 | A1 | 1/2009 | Greiner et al. | |
| 2010/0033818 | A1* | 2/2010 | Petcavich | B08B 17/06 |
| | | | | 359/507 |
| 2010/0047523 | A1* | 2/2010 | Kim et al. | 428/144 |
| 2010/0080958 | A1* | 4/2010 | Goelling | 428/172 |
| 2010/0203287 | A1 | 8/2010 | Jiang et al. | |

OTHER PUBLICATIONS

"How to Choose the Right Survival Knife." Instructables.com. Retrieved Sep. 23, 2015 from http://www.instructables.com/id/How-to-Choose-the-Right-Survival-Knife/step8/Blade-Shape/.*
International Preliminary Report on Patentability (Chapter I of the Patent Cooperation Treaty) dated Sep. 2, 2014, issued in International Application No. PCT/US2013/028595.

(Continued)

*Primary Examiner* — Laura A Auer
(74) *Attorney, Agent, or Firm* — Nields, Lemack & Frame, LLC

(57) ABSTRACT

Condensation can be an important process in both emerging and traditional power generation and water desalination technologies. Superhydrophobic nanostructures can promise enhanced condensation heat transfer by reducing the characteristic size of departing droplets via a surface-tension-driven mechanism. A superhydrophobic surface can include nanostructures of a metal oxide having further surface modification.

8 Claims, 14 Drawing Sheets

(56) References Cited

OTHER PUBLICATIONS

International Search Report dated May 15, 2013, issued in International Application No. PCT/US2013/028595.
Written Opinion of the International Searching Authority dated May 15, 2013, issued in International Application No. PCT/US2013/028595.
Lui J. et al: "Hierarchical nanostructures of cupric oxide on a copper substrate: controllable morphology and wettability", Journal of Materials Chemistry, vol. 16, No. 45, Sep. 26, 2006 (Sep. 26, 2006), pp. 4427-4434, XP055061477 RSC Publishing, London [GB] ISSN: 0959-9428, DOI: 10.1039/b611691d the whole document.
Jiang Y. et al: Self-Assemblied Monolayers of Dendron Thiols for Electrodeposition of Gold Nanostructures: Toward Fabrication of Superhydrophobic/Superhydrophilic Surfaces and pH-Responsive Surfaces:, Langmuir, vol. 21, No. 5, Feb. 3, 2005 (Feb. 3, 2005), pp. 1986-1990, XP055061497, ACS Publications, Washington, DC [US] ISSN: 0743-7463, DOI: 10.1021/la047491b the whole document.

\* cited by examiner

FIG. 1A
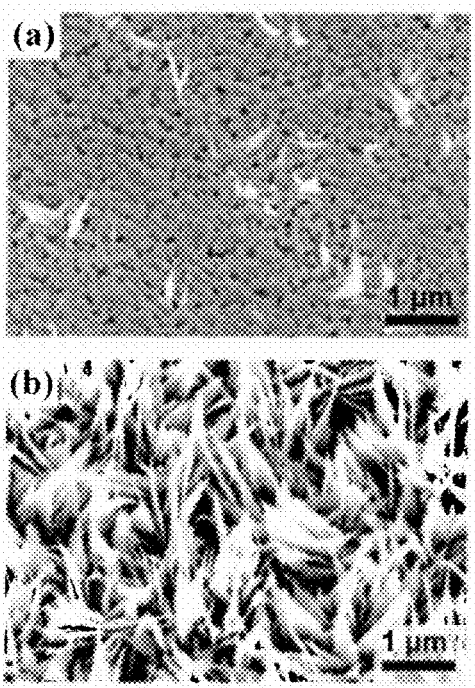
FIG. 1B
FIG. 1C
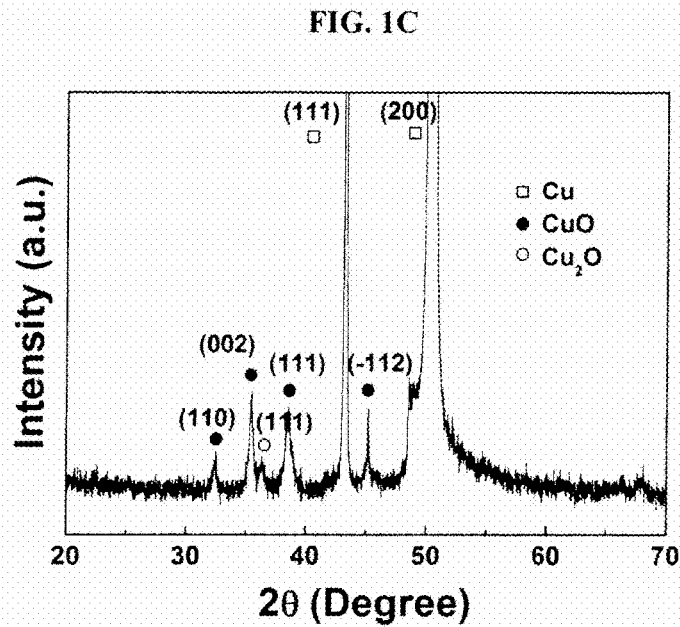
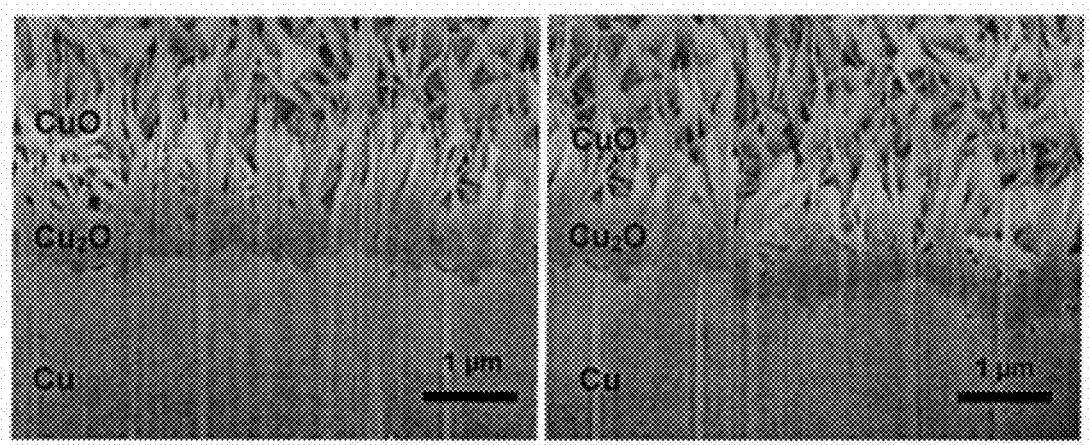
FIG. 1D

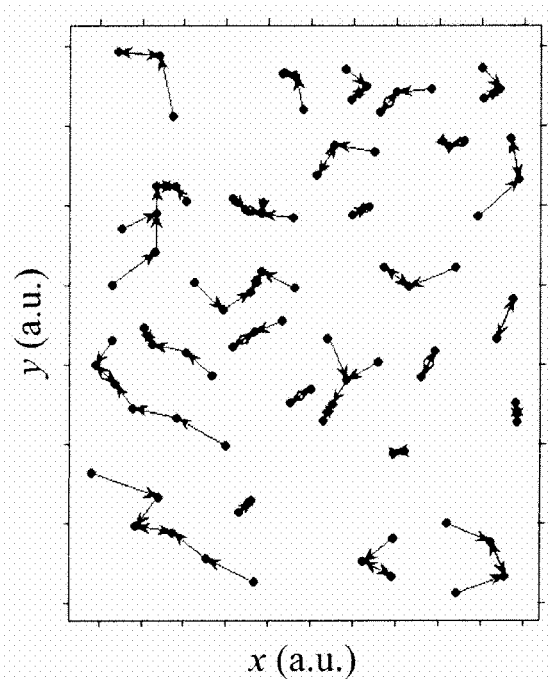 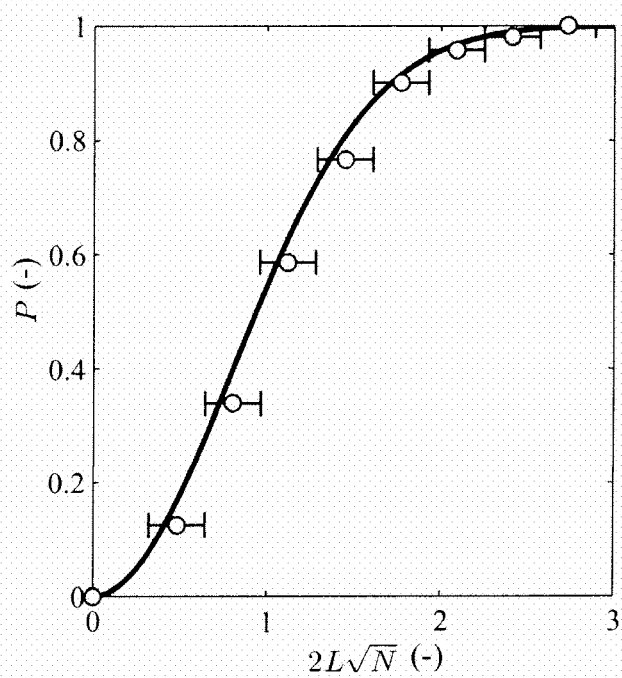
FIG. 7A
FIG. 7B
FIG. 7C

SUPERHYDROPHOBIC NANOSTRUCTURES

CLAIM OF PRIORITY

This application claims the benefit of prior U.S. Provisional Application No. 61/606,011, filed on Mar. 2, 2012, which is incorporated by reference in its entirety.

GOVERNMENT SPONSORSHIP

This invention was made with government support under Grant No. FA9550-11-1-0059 awarded by the Air Force Office of Scientific Research and under Grant Nos. DE-SC0001299 and DE-FG02-09ER46577 awarded by the Department of Energy. The government has certain rights in this invention."

TECHNICAL FIELD

The present invention relates to superhydrophobic surfaces.

BACKGROUND

Superhydrophobic surfaces, with static contact angles greater than 150°, droplet hystereses less than 10°, and roll-off tilt angles typically less than 2°, resist wetting and exhibit self-cleaning properties. Such properties are desirable for coatings on buildings, solar cells, and textiles, as well as drag reduction and increased heat transfer via drop-wise condensation. In nature, a wide array of wetland and aquatic plant leaves exhibit self-cleaning properties and resist wetting upon the impact of rainfall. Due to the abundance of water, these wetland plants do not rely on the intake of moisture through their leaves to hydrate. In fact, their superhydrophobic properties are a necessity for survival. Shedding water from the surface dramatically increases the uptake of $CO_2$ for photosynthesis, and these self-cleaning abilities reduce the formation of bacteria and fungi that would otherwise thrive in such hot moist climates. Significant efforts have focused on mimicking the naturally occurring structures of the lotus leaf, which demonstrates superhydrophobic self-cleaning properties. However, existing fabrication methods have limited the ability to accurately mimic both the surface structures and resulting water-repellent behavior of the lotus under droplet impact.

SUMMARY

In general, a superhydrophobic surface can include nanostructures of a metal oxide having further surface modification. Superhydrophobic nanostructures can provide enhanced condensation heat transfer by reducing the characteristic size of departing droplets via a surface-tension-driven mechanism.

In one aspect, a superhydrophobic surface can include a substrate including a metal and including a plurality of nanostructures on a surface of the substrate including a metal oxide of the metal, and a surface modifying layer on at least a portion of the nanostructures.

In another aspect, a method of making a superhydrophobic surface can include forming a plurality of nanostructures of a metal oxide on a substrate of a metal from which the metal oxide is derived, and depositing a surface modifying layer on at least a portion of the nanostructures.

In certain circumstances, metal oxide can be a copper oxide.

In certain other embodiments, the surface modifying layer can include a self-assembled monolayer. The self-assembled monolayer can be on a metal coating on the nanostructures. The surface modifying layer includes a thiol on a surface of the nanostructures. The thiol can be an alkyl thiol, for example, a fluorinated alkyl thiol. The metal coating can be deposited on the nanostructures.

In certain other embodiments, the surface modifying layer can include a silane on a surface of the nanostructures. For example, the silane can be an alkyl silane, such as a fluorinated alkyl silane. The silane can be deposited on the nanostructures.

In certain other embodiments, the surface modifying layer can include a fluorinated polymer. The fluorinated polymer can be deposited on the nanostructures.

Other features, objects, and advantages will be apparent from the description and drawings, and from the claims.

BRIEF DESCRIPTION OF THE DRAWINGS

FIGS. 1A-1B represent SEM images and XRD pattern (FIG. 1C) of copper oxide nanostructures, after 1 min (FIG. 1A) and 5 min (FIG. 1B-1C) of oxidation. FIG. 1D represents an SEM image of a cross-section of the nanostructured copper surface after a 10 minute oxidation step at separate FIB milled spot.

FIGS. 7A-7C represent the nucleation site spatial distribution. FIG. 7A represents a coordinate map graph showing the position of the nucleation sites and their nearest neighbor captured. FIG. 7B represents a graph showing the cumulative probability distribution of the nucleated droplet nearest neighbors compared to the predictions for a random distribution. FIG. 7C represents an OM image capturing the distribution of droplet nucleation sites on the Au/thiol functionalized CuO surface.

FIG. 8A represents a schematic depiction showing the excess liquid/vapor surface energy. FIG. 8B represents a graph showing the excess surface energy compared to the work of adhesion, as a function of the scaled droplet separation distance.

FIG. 9A represents a schematic depiction of the droplet on the condensing surface growing in the partially-wetting morphology. FIG. 9B represents the droplet thermal resistance diagram.

FIG. 10A represents a graph showing the experimentally measured droplet diameters as a function of time. FIG. 10A inset represents a graph showing the model predictions and a fitted $R \propto t^{1/3}$ scaling. FIG. 10B represents a graph showing the key thermal resistances normalized to the total thermal resistance corresponding to FIG. 10A as a function of droplet radius.

FIG. 13A represents a graph showing the predicted overall heat flux as a function of scaled droplet coalescence length compared to a smooth hydrophobic surface. FIG. 13A inset represents a graph showing the predicted heat transfer behavior for three different $r_p$ values. FIGS. 13B-13C represent a series of graphs showing the predicted overall heat flux ratio as a function of droplet coalescence length with two different $\delta_{CuO}$ values. FIG. 13D represents a graph showing the values of $q_{CuO}"/q_F"$ and $|q_{CuO}"/q_F"|_{max}$ for two different $\delta_{CuO}$ values.

DETAILED DESCRIPTION

Figure 2:
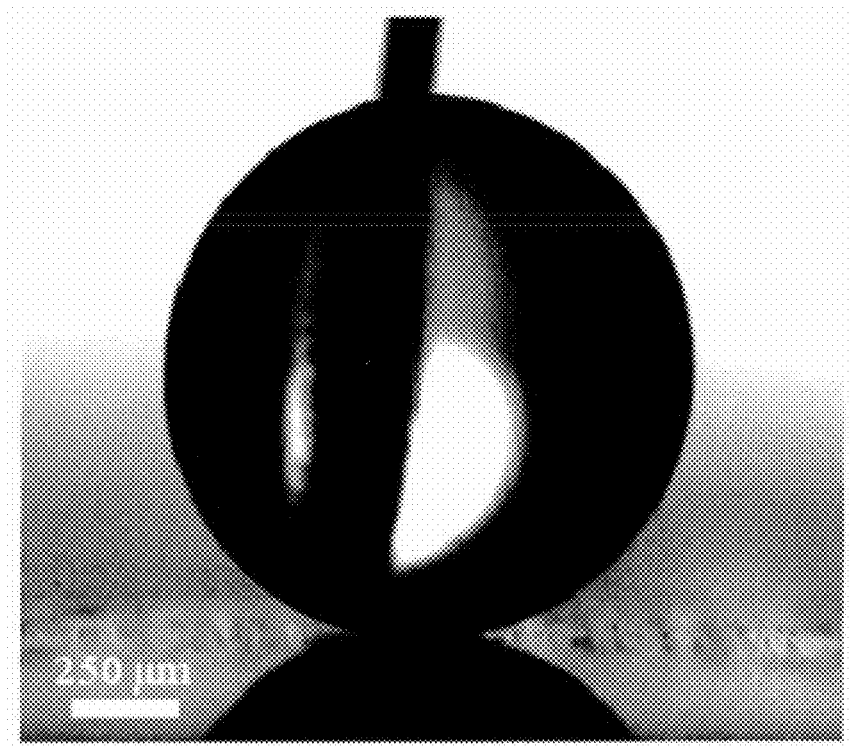
FIG. 2 represents an image of Cassie behavior of a macroscopic water droplet placed onto the Au/thiol-functionalized CuO surface.

Condensation is an important process in both emerging and traditional power generation and water desalination technologies. Superhydrophobic nanostructures promise enhanced condensation heat transfer by reducing the characteristic size of departing droplets via a surface-tension-driven mechanism. See, for example, Boreyko. J. B. and C.-H. Chen, *Self-Propelled Dropwise Condensate on Superhydrophobic Surfaces*. Physical Review Letters, 2009. 103 (18): p. 184501, which is incorporated by reference in its entirety. In this work, a scalable synthesis technique was investigated to produce oxide nanostructures on copper surfaces capable of sustaining superhydrophobic condensation and characterized the growth and departure behavior of condensed droplets. Nanostructured copper oxide (CuO) films were formed via chemical oxidation in an alkaline solution. A dense array of sharp CuO nanostructures with characteristic heights and widths of ~1 μm and ~300 nm, respectively, were formed. A gold film was deposited on the surface and functionalized with a self-assembled monolayer to make the surfaces hydrophobic. Condensation on these surfaces was then characterized using optical microscopy (OM) and environmental scanning electron microscopy (ESEM) to quantify the distribution of nucleation sites and elucidate the growth behavior of individual droplets with a characteristic size of ~1 to 10 μm at low supersaturations. CuO surfaces can offer superior condensation behavior in terms of emergent droplet morphology and coalescence dynamics and a significant enhancement in heat transfer performance when compared to state-of-the-art condensing surfaces. Furthermore, the chemical-oxidation-based CuO fabrication process provides a simple and readily scalable method to create superhydrophobic condensation surfaces that can sustain droplet jumping behavior. Comparison of the observed behavior to a recently developed model for condensation on superhydrophobic surfaces (see, Miljkovic, N., R. Enright, and P. N. Wang, *Growth Dynamics During Dropwise Condensation on Nanostructured Superhydrophohic Surfaces*, in Proceedings of the 3rd Micro/Nanoscale Heat & Mass Transfer International Conference. 2012, ASME: Atlanta, GA and Miljkovic, N., R. Enright, and E. N. Wang, *Dropwise condensation droplet growth dynamics on superhydrophobic surfaces*. unpublished 2011, each of which is incorporated by reference in its entirety) suggests a restricted regime of heat transfer enhancement compared to a corresponding smooth hydrophobic surface due to the large apparent contact angles demonstrated by the CuO surface.

Efficient condensation is required for a range of industrial processes. In particular the efficiency of steam power cycles, thermal-based desalination, and phase-change-based thermal management solutions for electronics cooling are functionally dependent on the condensation behavior of water on heat transfer surfaces. In the 1930's, Schmidt and co-workers identified dropwise condensation (DWC) as a superior mode of heat transfer in comparison to filmwise condensation (FWC) (see Schmidt, E., Schurig, W. and Sellschopp, W. *Tech. Mech. Thermodynamik*, 1, 53-63 (1930), which is incorporated by reference in its entirety). Subsequent investigations found that DWC heat transfer rates could be up to an order of magnitude larger than those associated with FWC. See, for example, Rose, J. W. *Proc Instn Mech Engrs*, Vol 216, Part A: J Power and Energy (2002), which is incorporated by reference in its entirety. To achieve efficient DWC, condensate droplets must be rapidly removed from the surface because the increasing droplet size acts as a thermal barrier. DWC is associated with the periodic departure of large, thermally-insulating droplets from the surface, typically under the influence of gravity, that allows for the re-growth of smaller droplets with reduced thermal resistance on the exposed areas. Rose and co-workers (id.) have argued that the self-similar distribution of drop sizes is a significant factor governing the overall rate of heat transfer. Under the influence of gravity, the requirement for droplet departure, to first order, is given by $Bo=\rho g d^2/\gamma \geq 1$ where $\rho$ is the condensate density, g is the local acceleration due to gravity, d is the droplet diameter, and γ is the condensate surface tension. For water, this leads to a distribution of droplets ranging in size from the critical nucleus (~1 nm) up to the capillary length (~1 mm). However, recent investigations by Boreyko & Chen (PRL, 2009) have demonstrated that the upper drop size can be restricted to less than 100 μm ($Bo<10^{-3}$) via a surface-tension-driven departure mechanism that occurs on nanostructured superhydrophobic surfaces. When small droplets (e.g. ~10-100 μm) merge on suitably designed superhydrophobic surfaces, they can undergo coalescence-induced droplet ejection or "jumping" independent of gravity due to the release of excess surface energy. The nanostructured surface beneath the coalescing droplets reduces the droplet adhesion to the substrate by minimizing the solid fraction and breaks the symmetry of the coalesced droplet. As a result, the droplet accelerates and departs perpendicular to the surface. Such droplet jumping offers an avenue to further enhance condensation heat transfer over conventional dropwise condensation by increasing the time-averaged density of small droplets, which transfer heat more efficiently from the vapor to the substrate. Accordingly, these surfaces are attractive for applications such as atmospheric water harvesting and dehumidification where the heat fluxes are relatively low and droplets can be maintained in a highly mobile state.

In particular, a superhydrophobic surface can be formed from on a metal substrate by forming a plurality of nanostructures of a metal oxide on the substrate. The metal oxide can form a layer on a surface of the substrate. The layer can have a thickness sufficient to permit acceptable heat transfer through the layer. The layer can be thin. For example, the metal oxide layer can be less than 10 micrometers, less than 5 micrometers, less than 2 micrometers, less than 1 micrometer, less than 0.5 micrometers, or less than 0.1 micrometers in thickness.

The layer of metal oxide can be grown on the surface in a manner that produces a variety of surface features, some portion of which are nanostructures. The layer of metal oxide can be grown by chemical or electrochemical oxidation of a metal substrate. For example, a copper substrate can be treated to form a layer of nanostructured copper oxide on the surface. Alternatively, an aluminum substrate can be treated to form a layer of nanostructured aluminum oxide on the surface.

The nanostructure can have dimensions of approximately 3 μm or smaller, 2 μm or smaller. 1 μm or smaller, or 500 nm or smaller. In certain dimensions, the nanostructure can in some cases extend to greater dimensions; for example, a line-shaped feature might be several cm or several mm in length, or less, e.g., several nm in width up to several urn in length. Despite the length extending beyond the nanoscale, this feature would nonetheless be considered a nanostructure, because of the nm dimension of the width or depth.

Once the nanostructures have been formed, the surface can be coated with one or more coating layers. The coating layer can be selected to impart desired properties on the surface, such as, for example, mechanical robustness or increased hydrophobicity, or both. For example, the superhydrophobic surface can include a surface modifying layer on at least a portion of the nanostructures. The surface modifying layer can be a single layer or a multilayer. For example, an initial coating layer, e.g., a metallic layer can be deposited by (for example) electroless plating, chemical vapor deposition or atomic layer deposition. The initial coating layer can be a polymer or a metal. The surface modifying layer can be a hydrophobic material, such as a polymer or self-assembled monolayer, directly on the nanostructure or on the initial coating layer. For example, a silane or a thiol can be assembled on a surface. The hydrophobic material; e.g., a hydrophobic polymer, hydrophobic thiol, hydrophobic carboxylic acid or hydrophobic silane, can include hydrocarbon (e.g., a saturated hydrocarbon) groups, halohydrocarbon groups (e.g., a saturated fluorohydrocarbon), or halocarbon groups (e.g., a perfluorinated alkyl group). In certain examples, the hydrophobic material can be trichloro(1H,1H,2H,2H-perfluorooctyl)silane, (tridecafluoro-1,1,2,2-tetrahydrooctyl)-1-trichlorosilane, (1H,1H, 2H,2H-perfluorodecyl acrylate), a Teflon amorphous fluoropolymer resin, or an alkyl or fluoroalkyl thiol deposited by appropriate techniques. The hydrophobic material can have $C_2$-$C_{18}$ groups that can be fluorinated to varying degrees. The trifluoromethyl or difluoromethyl groups on the surface can allow the surface properties to be tailored, for example, to have advancing wetting angles of 105, 110, 115 or 120 degrees, depending on the choice of fluorinated alkyl group and base structure.

For example, the surface modifying layer can be formed on an oxide nanostructures by gold sputter followed by self-assembly of a thiol monolayer. However, other more practical techniques, can be used to make the oxide nanostructures hydrophobic including initiated chemical vapor deposition of the polymer poly(1H,1H,2H,2H-perfluorodecyl acrylate) (PFDA), chemical vapor deposition of a fluorinated silane film (TPFS), dip-coating of a fluorinated silane film (FDTS), and spin-coating of the polymer poly (tetrafluoroethylene (PTFE) (w/an adhesion promoter).

Spin-Coat Functionalization

A Teflon amorphous fluoropolymer resin (<0.5 wt. %, Du Pont Polymers, Inc.) can be first dissolved into a FC40 solvent (3M Inc.). A 1 wt. % fluoroalkyl monosilane solvent (Cvtonix Inc.) is mixed into the solution to strengthen adhesion between the hydrophobic layer and copper oxide. The use of fluoroalkyl solvent can be found to be critical to prevent degradation of superhydrophobicity. The solution can then be coated on a CuO nanostructured surface, baked at 180° C. for 10 min to dry out the solvent, and then annealed at 340° C. for >1 hour to improve the surface uniformity and adhesion. Goniometric measurements on a smooth surface coated with the Teflon film typically demonstrate advancing contact angles of $\theta_a \approx 120°$.

CVD Functionalization

A chemical vapour deposition (CVD) process can be used to attach a conformal self-assembled trichloro(1H,1H,2H, 2H-perfluorooctyl)silane (TPFS) molecular film to the nanostructured surface. Following a 10 minute $O_2$ plasma clean, the surface can be exposed to a vapor of PTFS at room temperature and a pressure of ~17.5 kPa (absolute) for a period of time ranging from 15 minutes to several hours. A strong covalent bond is formed between the silane molecule and the oxygen group on the oxide surface via a condensation reaction that produces a HCl by-product. Following deposition, the sample can be rinsed with a solvent (such as ethanol) and dried. Following deposition an optional (not necessary) annealing step can be performed whereby the substrate is heated to >100° C. in order to induce molecular rearrangement producing a more uniform film structure. Note that the process is not limited to the PTFS molecule, but may also be performed with silane molecules that contain a similar ligand allowing for a condensation reaction to occur at the surface.

iCVD Functionalization

Initiated chemical vapour deposition (iCVD), a process whereby polymerization occurs on the surface to be coated, can be performed to create a conformal coating of poly(1H, 1H,2H,2H-perfluorodecyl acrylate) (PPFDA) on the CuO nanostructures. In this process the thickness of the polymer coating (~10 nm) can be tuned by adjusting the deposition time. See, for example, Gupta et al. Chem. Mater. 2008, 20 (4), pp 1646-1651, which is incorporated by reference in its entirety.

Contact angle hysteresis is defined as the difference between the advancing and receding contact angles, and the roll-off tilt angle is the angle of a tilted surface at which a droplet will roll off. These three values are inter-related and collectively used to determine a surface's ability to demonstrate self-cleaning behavior. The surface can be superhydrophobic, with static contact angles greater than 170°, contact angle hysteresis of less than 2°, and roll-off angles of less than 0.25°. The surface can also exhibit advantageous condensation mass and heat-transfer properties.

The implementation of superhydrophobic surfaces is of particular interest as a means to improve the efficiency of thermal and mass transport processes dependent on the condensation of water. Superhydrophobic condensation can be obtained provided two criteria are satisfied See Enright, R., et al., *Superhydrophobic condensation: The role of energy barriers and size-scale*. unpublished, 2011, which is incorporated by reference in its entirety. The first is an approximately scale-invariant wetting energy criterion, which determines whether the contact line remains pinned at the base of a partially wetting droplet, leading to a weakly-pinned Cassie-like state (see Cassie, A. B. D. and S. Baxter, *Wettability of porous surfaces*. Trans. Faraday Soc., 1944. 40: p. 546, which is incorporated by reference in its entirety), or de-pins to form a Wenzel droplet. See Quéré, D., *Wetting and Roughness*. Annual Review of Materials Research, 2008. 38(1): p. 71-99, which is incorporated by reference in its entirety. The pinning energy barrier during growth is given by the non-equilibrium Wenzel equation, $\cos \theta_a^W = r \cos \theta_a$, where $\theta_a$ is the advancing contact angle. This pinning barrier is then compared to the pinning barrier associated with the droplet advancing over the discontinuous surface in the Cassie state, $\cos \theta_a^{CB} = -1$ (see Choi, W., et al., *A modified Cassie-Baxter relationship to explain contact angle hysteresis and anisotropy on non-wetting textured surfaces*. J. Colloid Interface Sci., 2009. 339: p. 208-216, which is incorporated by reference in its entirety), such that a criterion can be defined to delineate the expected droplet morphology given by $$E^* = \frac{\cos\theta_a^{CB}}{\cos\theta_a^W} = \frac{-1}{r\cos\theta_a}. \tag{1}$$

When $E^* > 1$ the contact line near the base of the pillars can overcome the energy barrier to de-pin and a Wenzel drop is formed. If $E^* < 1$ complete de-pinning is prevented and the droplet spreads over the top of the pillar array forming a Cassie droplet as the drop size becomes larger than a length scale characterizing the pinning barrier, $R \gg l$.

The second criterion for superhydrophobic condensation introduces a scale requirement by linking a characteristic size of the roughness defining the pinning energy barrier to the mean separation distance between nucleation sites (L). For stable Cassie growth, $(L)/l \geq 2$ is the minimum requirement to avoid by-passing the pinning barrier defined by Eq. 1 during droplet coalescence.

In order to apply these surfaces for application in large-scale heat transfer there is a requirement for scalable processes compatible with existing engineering heat transfer materials. Furthermore, the fabrication method should minimize parasitic resistances that could negate the advantage of this unique wetting behavior.

Here a scalable synthesis method is demonstrated for modifying copper surfaces to create unique oxide nanostructures that, once functionalized, can maintain Cassie condensation behavior while minimizing parasitic resistances due to the self-limiting behavior of the oxidation process. A combination of imaging and modeling suggests that there is a critical nucleation density for the CuO surface that delineates heat transfer enhancement from degradation with respect to a smooth hydrophobic surface.

Surface Synthesis & Characterization

To synthesize the surfaces, commercially available oxygen-free copper sheet (99.9% purity, 0.8 mm thickness) was cut into ~1-2 cm² tabs as substrates. Each Cu tab was cleaned in an ultrasonic bath with acetone for ~5 min and rinsed with de-ionized (DI) water. The substrate was then dipped into a 2.0 M hydrochloric acid solution for 30 seconds to remove the native oxide, then triple-rinsed with DI water, and dried with pure nitrogen.

Nanostructured copper oxide films were formed by immersing the cleaned substrate into a hot (~95° C.) alkaline solution composed of $NaClO_2$, NaOH, $Na_3PO_4 \cdot 12H_2O$, and de-ionized (DI) water (3,75:5:10:100 wt. %). During the oxidation process, a thin (<200 nm) $Cu_2O$ layer is initially formed on the copper surface and then re-oxidized to form CuO. FIG. 1A shows that sharp CuO nanostructures start to grow on the $Cu_2O$ intermediate layer. The surface reaction can be described as (see, Brisard, G. M., et al., *Application of probe beam deflection to study the electrooxidation of copper in alkaline media*. Electrochimica Acta, 1995. 40(7): p. 859-865, which is incorporated by reference in its entirety):

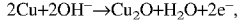

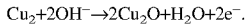

The height of the oxide nanostructures was approximately 1 μm after 5 minutes of growth (FIG. 1B). After that, the oxide growth rate significantly slows down to an almost negligible level as the CuO layer passivates the copper surface. See, Drogowska, M., L. Brossard, and H. Menard, *Influence of anions on the passivity behavior of copper in alkaline solutions*. Surface and Coatings Technology. 34(4): p. 383-400, which is incorporated by reference in its entirety. The XRD result (FIG. 1C) shows a strong CuO peak originating from the sharp oxide nanostructures and a weak $Cu_2O$ peak from the underlying layer. The unique needle-like morphology of the CuO nanostructures and the self-limiting behavior of the oxidation process are key minimize parasitic conduction thermal resistance of the oxide layers ($k_{CuO} \approx 0.2$ W/m·K).

To characterize the total oxide thickness of the fabricated samples, we used focused ion beam milling (FIB) (NVision 40 Dual Beam Focused Ion Beam, Carl Zeiss GMBH) and SEM imaging. Milling was performed with normal incidence of the ion beam (sample tilt of 54°), ion beam energy of 30 keV, and ion current of 300 pA. The structure cross-sections were obtained by milling 8 μm deep×20 μm wide trenches. Due to the good milling response of Cu, surface polishing was not required. All samples were imaged at 36° tilt using the in lens detector with electron beam energies of 7 keV. FIG. 1D shows the cross-section images of a nanostructured sample. The underlying $Cu_2O$ oxide thickness was found to be $\delta_{Cu2O} \approx 300$ nm. With the addition of the CuO nanostructures, the total copper oxide thickness was $\delta_{Cu2O} + \delta_{CuO} \approx 1.5$ μm. The morphology of the CuO nanostructures resemble thin, but broad blades converging to a sharp point with a typical thickness of ≤100 nm and average widths of ≈300 nm.

The unique blade-like morphology of the CuO nanostructures, with a tip dimension of ≤10 nm, ensure nucleation within the structure (as opposed to the tips of the structure) due to the increased energy barrier associated with nucleation on features similar in size to the critical nucleation radius ($R_c \leq 35$ nm for water and typical condensation conditions studied here, See, Kashchiev, D., 2000, *Nucleation: Basic Theory with Applications*, Butterworth-Heinemann, Oxford, which is incorporated by reference in its entirety.). This feature of the nanostructure geometry promotes the formation of partially-wetting droplet morphologies, which are essential to minimizing individual droplet thermal resistance, since Gibb's criterion can be satisfied. See, Miljkovic, N., Enright, R., and Wang, E. N., 2012, "Effect of droplet morphology on growth dynamics and heat transfer during condensation on superhydrophobic nanostructured surfaces," ACS Nano, 6(2), pp. 1776-1785, Cao, L., Jones, A. K., Sikka, V. K., Wu, J. Z., and Gao, D., 2009, "Anti-icing superhydrophobic coatings," Langmuir. 25(21), pp. 12444-12448, Gibbs, J. W., Bumstead, H. A., and Van Name, R. G., 1906, *The scientific papers of J. Willard Gibbs*, Longmans, Green and co., New York and Bombay, and Quéré, D., 2008, "Wetting and Roughness," Annual Review of Materials Research, 38(1), pp. 71-99, each of which is incorporated by reference in its entirety. Furthermore, the self-limiting behavior of the oxidation process is critical to minimizing the parasitic thermal conduction resistance of the oxide layers since the bulk thermal conductivities of the two copper oxide species ($k_{CuO} \approx 20$ W/m·K, $k_{Cu2O} \approx 30$ W/m·K, see, Kwak, K., and Kim, C., 2005, "Viscosity and thermal conductivity of copper oxide nanofluid," Korea-Aust Rheol J. 17(2), pp. 35-40, which is incorporated by reference in its entirety.) are an order of magnitude smaller than the native copper substrate ($k_{Cu} \approx 400$ W/m·K).

The CuO nanostructures were functionalized by first coating them with a 30 nm-thick coating of Au followed by the formation of a self-assembled monolayer (SAM) of 1H,1H,2H,2H-perfluorodecanethiol by immersing the oxidized substrate in 1 mM ethanol solution for 1 hr. Goniometric measurements on a smooth thiolated Au surface showed advancing and receding contact angles of $\theta_a=121.1°\pm2.2°$ and $\theta_r=106.3°\pm2.4°$, respectively, to give a calculated equilibrium angle of $\theta_e=\cos^{-1}[0.5(\cos \theta_a+\cos \theta_r)]=113.5°\pm3°$.

The effective solid fraction of the CuO surface was extracted from apparent contact angle measurements of a water droplet placed onto the Au/thiol-functionalized CuO surface, $\theta^{CB}=169.7°+2°$ ($\Delta\theta\leq2°$) using the Cassie-Baxter equation, $\cos \theta^{CB}$, yielding a value of $\varphi_{eff}=0.027\pm0.011$ (FIG. 2). In order to extract the effective roughness defining the pinning energy barrier in Eq. 1, contact angle measurements of formamide (Sigma, molecular biology grade) were performed on both the smooth and nanostructured surface. The advancing angle on the smooth surface was found to be $\theta_a=95.3°\pm1.4°$ ($\theta_r=90.2°\pm2.1°$), while the advancing Wenzel angle on the CuO surface was found to be $\theta_a^W=160.6°\pm3.2°$ ($\theta_r^W=145.9°\pm2°$. Note that the Wenzel state was inferred by the observation of significant contact angle hysteresis between the advancing and receding values, $\Delta\theta\approx15°$. The measurements yielded $r_{eff}=10.2\pm2.8$. The effective roughness value obtained should be viewed as an indication of the complex contact line pinning apparent on the nanostructured CuO rather than a measure of the absolute roughness defined by the physical area of the rough surface in comparison to a corresponding smooth surface. See, Blow, M. L., H. Kusumaatmaja, and J. M. Yeomans, *Imbibition through an array of triangular posts*. J. Phys.: Condens. Matter, 2009. 21(464125), which is incorporated by reference in its entirety.

OM Condensation Experiments

Figure 3:
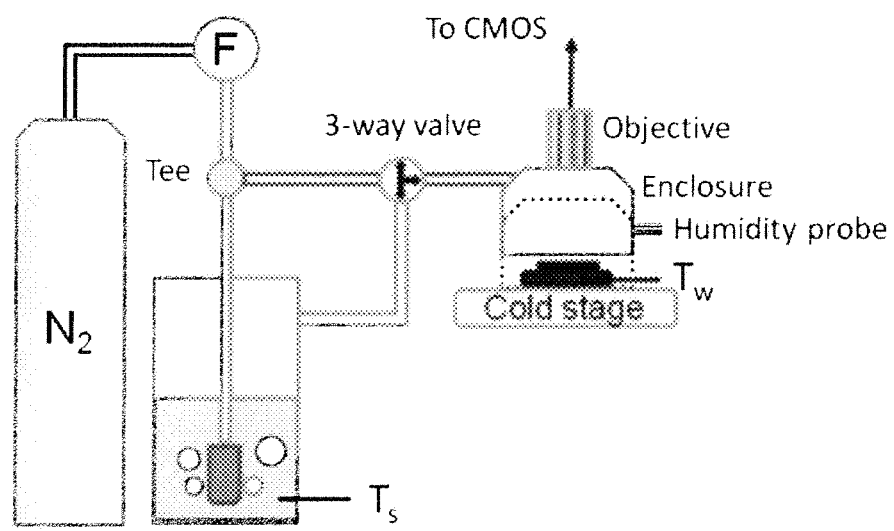
FIG. 3 represents a schematic depiction of the experimental optical microscopy set-up for analyzing global condensation behavior.

Global droplet nucleation and growth behavior was studied with optical microscopy using a custom built set-up shown diagrammatically in FIG. 3. A supply of water-saturated $N_2$ was obtained by sparging a temperature-controlled water reservoir with dry $N_2$. A reservoir by-pass valve was installed to provide for the delivery of dry $N_2$ to the sample as it was being cooled to the test temperature at the beginning of each experiment. The sample temperature was set using a temperature-controlled stage (Instec, TS102-00). Good thermal contact between the sample and the temperature control stage was ensured by interposing a thin layer of thermal grease (Omegatherm, Omega) with a stated thermal conductivity of 2.2 W/m·K.

Once the stage temperature stabilized at the test temperature, $T_w=283\pm0.1$ K, the by-pass valve was closed to initiate the flow of water-saturated $N_2$ to the sample enclosure at a constant flow rate of Q=2.5 l/min, marking the start of the experiment. The chamber humidity (Hygroclip, Rotronic) was recorded throughout the experiment. The supersaturation, $S=p_v p_w$, was controlled by adjusting the water reservoir temperature through which the $N_2$ was sparged. Droplet nucleation and growth was recorded at intervals of 0.1 seconds using a high-speed (CMOS) camera (Phantom v7.1, Vision Research), operating at a resolution of 800×600 and having a physical pixel size of 22 µm, attached to an upright microscope (Eclipse LV100, Nikon). Imaging was performed with either a 40× (Plan Fluor ELWD, Nikon) or a 100× (L Plan SLWD, Nikon) objective. The relationship between length and pixel count was calibrated with the known pillar spacing of microstructured surface previously found using scanning electron microscopy.

ESEM Condensation Experiments

The details of the nucleation and growth of condensed droplets on the functionalized CuO surface were studied using an environmental scanning electron microscope (Zeiss EVO 55 ESEM). Back scatter detection mode was employed with a high gain. The water vapor pressure in the ESEM chamber was 1.55 kPa. Typical image capture was obtained with a beam potential of 20 kV and variable probe current depending on stage inclination angle. A 500 µm lower aperture was used in series with a 1000 µm variable pressure upper aperture for greater detail. The sample temperature was initially set to 285±0.1 K using a cold stage and allowed to equilibrate for 5 minutes. After equilibration, the surface temperature was decreased to 284±0.1 K resulting in nucleation of water droplets on the sample surface due to condensation of the saturated water vapour.

Images and recordings were obtained at an inclination angle of 70° to 80° from the horizontal; at a working distance ranging from 3 to 5 mm. This was done to ensure good imaging of the droplet nucleation dynamics at the surface, not typically seen with an overhead nucleation image, and to minimize substrate heating due to the electron beam. Recordings were performed at a 500 ms frame speed corresponding to two frames per second. To ensure good thermal contact between the sample and cold stage, copper tape was used for mounting.

Geometric Evolution of Individual Droplets

Figure 4A:
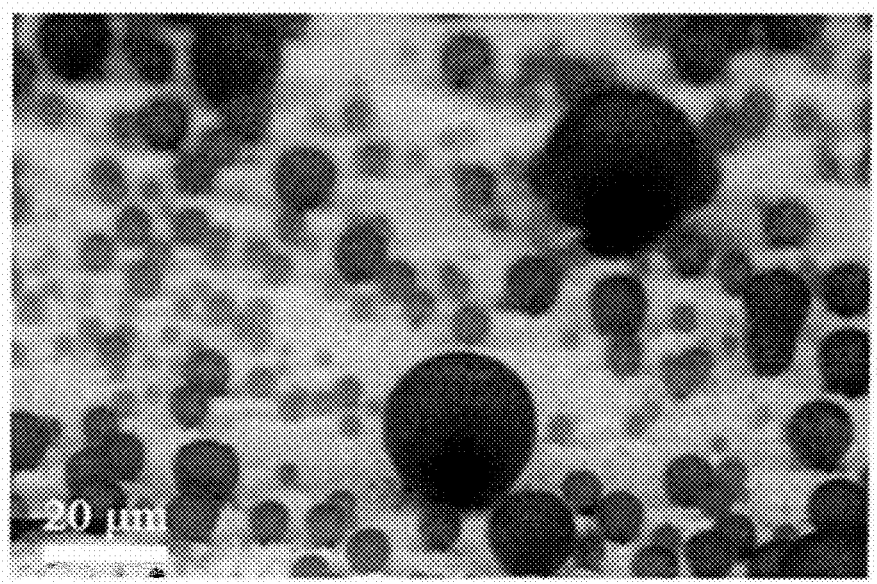
FIG. 4A represents an ESEM image capturing the droplet growth process on the Au/thiol functionalized CuO surface.
Figure 4B:
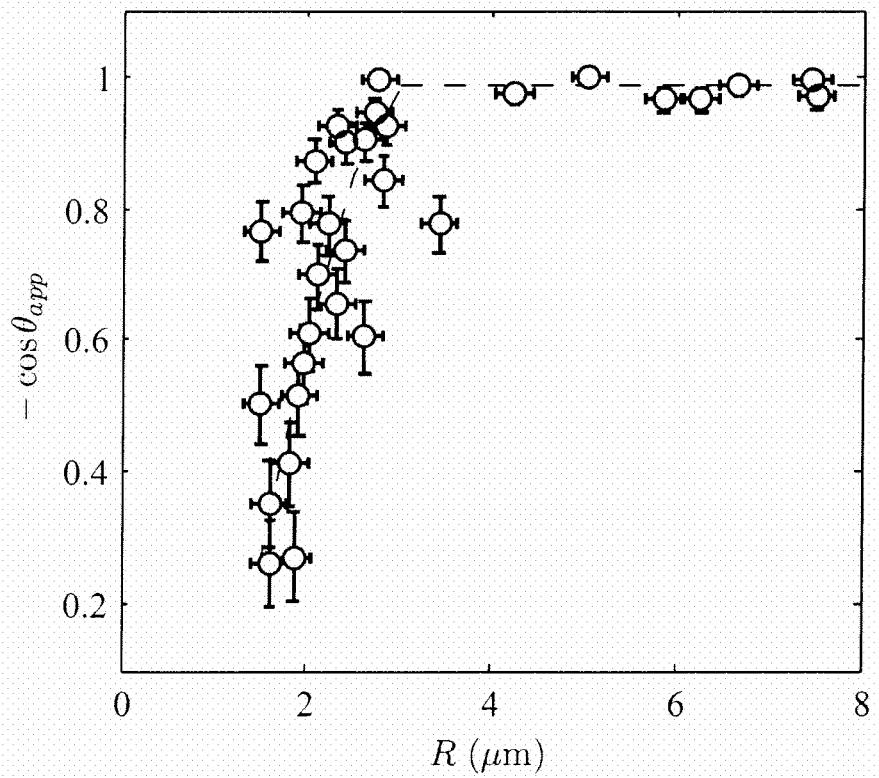
FIG. 4B represents a graph showing the droplet apparent contact angle as a function of the droplet size extracted from the ESEM data on the Au/thiol functionalized CuO surface.

The droplet growth behavior on the hydrophobic CuO surfaces (FIG. 4A) was characteristic of the Cassie wetting state emerging from a pinned wetted region on the surface consistent with an estimated $E^*(r_{eff}) \approx 0.19$. The ESEM images of water droplets showed strong topographic contrast such that reliable contact angle measurements could be made. See, Donald, A. M., et al., *Topographic contrast of partially wetting water droplets in environmental scanning electron microscopy*. Journal of Microscopy-Oxford, 2001. 204: p. 172-183, which is incorporated by reference in its entirety. Droplet contact angles were determined by fitting a circle to each individual droplet (spherical approximation) and determining the slope of the tangent where the droplet neck intersects the fitted circle. This was more difficult for larger droplets due to the difficulty in determining where the base of the droplet intersects the fitted circle, resulting in a larger error and fewer data points. Each contact angle measurement was recorded along with the droplet diameter (FIG. 4B). The error associated with the droplet diameter measurement was due to the image resolution. The CuO droplet morphology showed an initially varying contact angle (R≤3 µm) due to local pinning of the droplet contact line until the advancing angle is reached R≈3 µm, whose value is consistent with the macroscopically measured value (FIG. 2). The effective diameter of the pinned region can be estimated to be ~1-2 µm based on the early stage contact angle behavior, which is consistent with the characteristic spacing of the CuO nanostructures estimated as $1 \sim \sqrt{\pi}d/2\sqrt{\sigma_{eff}}=1.63$ µm. This pinning behavior is in agreement with previous studies of droplet growth on well-controlled nanopillars geometries and Cu(OH)$_2$ nanowires. See, Rykaczewski, K. and J. H. J. Scott, *Methodology for imaging nano-to-microscale water condensation dynamics on complex nanostructures*. ACS Nano, 2011. 5(7): p. 5962-5968, which is incorporated by reference in its entirety.

Figure 5A:
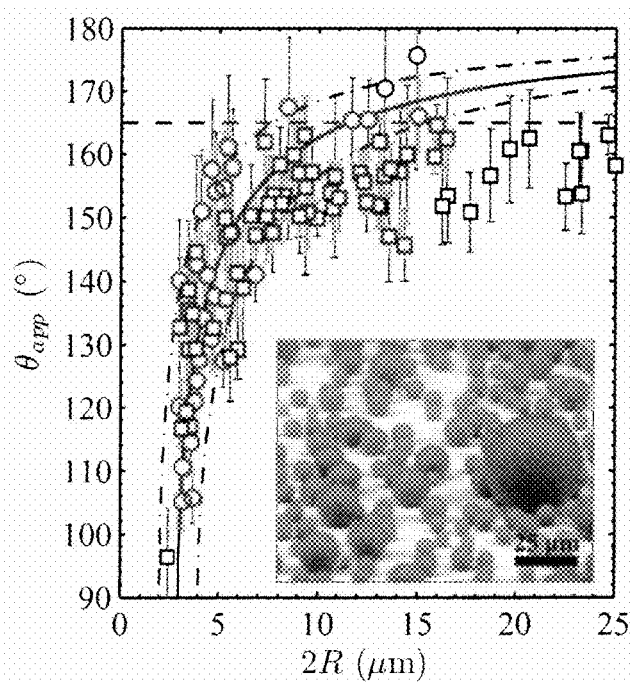
FIG. 5A represents a graph showing the droplet apparent contact angle as a function of the droplet diameter on the Au/thiol and silane functionalized CuO surfaces.

In FIG. 5A, the apparent contact angle behavior of condensed droplets growing on the hydrophobic CuO in surfaces at S=1.07±0.1 during ESEM imaging is shown. The ESEM images of water droplets showed strong topographic contrast allowing reliable contact angle measurements to be made. See, Donald, A. M., Stelmashenko, N. A., Craven, J. P., Terentjev, E. M., and Thiel, B. L., 2001, "Topographic contrast of partially wetting water droplets in environmental scanning electron microscopy." Journal of Microscopy-Oxford, 204(2), pp. 172-183, which is incorporated by reference in its entirety. Droplet contact angles were determined by fitting a circle to each individual droplet (spherical approximation) and determining the droplet radius R and the height of the spherical segment H. The contact angle was calculated from R and H as $$\theta_{app} = \sin^{-1}\left(\frac{H-R}{R}\right) + 90°. \quad (2)$$

Figure 5B:
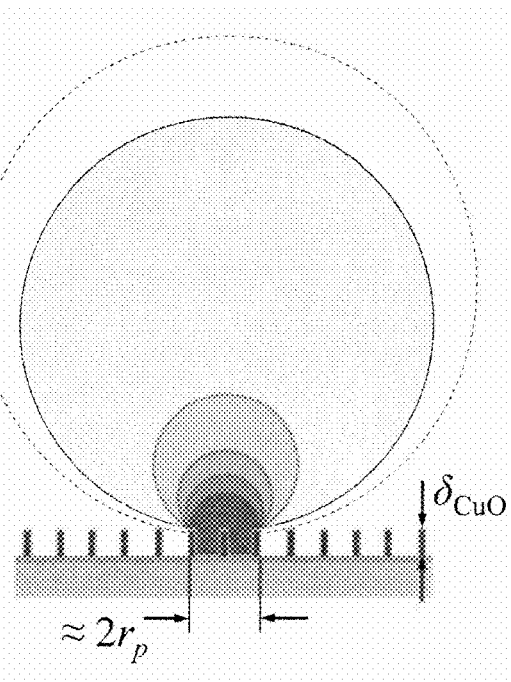
FIG. 5B represents a schematic depiction showing the predicted evolution of the droplet shape.

This image processing was more difficult for lower viewing angles (i.e. larger droplets) due to the challenge in determining where the base of the droplet intersects the fitted circle, resulting in a larger error and fewer data points. The error associated with the droplet radius measurement was due to the limit of the image resolution (typically 200-500 nm). The CuO droplet morphology showed an initially varying contact angle (R≤3-4 μm) because of locally pinned contact lines at the droplet base. Radius-dependent contact angle behavior continued up to the point where the interface of the droplet made contact with surrounding nanostructures and began spreading over the surface in the Cassie state with an approximately constant advancing angle. The observed advancing angle compares reasonably well with the macroscopically measured value of $\theta_a^{CB} \approx 165°$. The early stage variation in the apparent contact angle was modeled as $$\theta_{app}(R) = \cos^{-1}\left(\frac{r_p}{R}\right) + 90°, \quad (3)$$

assuming a fixed pinned base area of $A_p \approx \pi r_p^2$ underneath the individual droplets before coalescence (FIG. 5B). In FIG. 5A, the apparent contact angle of droplets as a function of the droplet diameter extracted from the ESEM data on the Au/thiol (red circles) and silane (blue squares) functionalized CuO surfaces ($p_v$=1300±75 Pa, $T_w$=283±1.5 K, S=1.07±0.1) was plotted. The solid curve is defined as $\theta_{app}=\cos^{-1}(r_p/R)+90°$ with $r_p$=1.5 μm. The dashed dot curves represent the bounds of Eq. 3 for $r_p$=1.5±0.5 μm. The horizontal dashed line represents the macroscopically measured apparent contact angle, $\theta_{app}\approx165°$. The inset shows a typical ESEM image captured during the droplet growth process on the silane functionalized CuO surface. FIG. 5B shows the evolution of the droplet shape predicted by Eq. 3 for 90°≤$\theta_{app}$≤170° in steps of 20° (droplets bounded by solid curves). The model fit (dashed lines) is defined as $\theta_{CuO}(R)$= 40°+43.32R° (R≤3 μm) and $\theta_{CuO}$=170° (R>3 μm). Fitting Eq. 3 to the extracted contact angle data, we estimated that the characteristic radius of the pinned region to be $r_p\approx$1-2 μm, which compares well with the characteristic spacing of the CuO nanostructures estimated as $l \cong \sqrt{\pi}d/(2\sqrt{\sigma_{eff}})$=1.2 μm with d=300 nm and $\sigma_{eff}$=0.05. This pinning behavior is in agreement with previous studies of droplet growth on well-controlled nanopillars geometries and Cu(OH)$_2$ nanowires. See, Enright, R., Miljkovic, N., Al-Obeidi, A., Thompson, C. V., and Wang, E. N., 2012, "Condensation on superhydrophobic surfaces: The role of local energy barriers and structure length scale," Langmuir, 28(40), pp. 14424-14432, and Rykaczewski, K. and J. H. J. Scott, *Methodology for imaging nano-to-microscale water condensation dynamics on complex nanostructures*. ACS Nano, 2011. 5(7): p. 5962-5968, each of which is incorporated by reference in its entirety.

Emergent Droplet Morphology

Figures 6A, 6B, 6C, 6D:
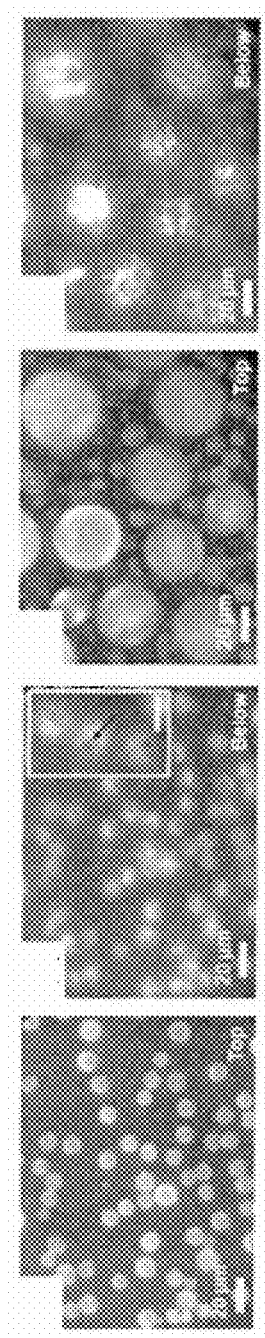
FIGS. 6A-6D represent ESEM images showing the emergent droplet morphology on the functionalized CuO surfaces in the coalescence-dominated growth stage.

The influence of the nucleation density on the emergent wetting state was explored using optical microscopy. Optical microscopy offers an advantage over ESEM since larger vapor pressures can be achieved without compromising image quality. Partially-wetting Cassie behavior with jumping droplets emerged on the Au/thiolated CuO surface where (L)=0.5N$^{-0.5}$≈8.1 μm obtained by focusing at the surface (top, FIG. 6A) and confirmed by focusing through the droplets (below, FIG. 6B) to show the wetting state. In FIGS. 6A-6B, condensation on the Au/thiolated surface at S≈1.5 resulted in a nucleation density of N=4×10$^9$ m$^{-2}$. The red arrow in the inset of FIG. 6B points to a light-absorbing region surrounded by a light-reflecting region indicative of the partial-wetting morphology (Inset scale bar: 10 μm). The droplets were found to be weakly pinned to the surface as evidenced by the observation of droplet jumping (coalescing droplets disappeared from the field of view). Focusing through the droplets (FIG. 6B) revealed that, in most cases, a single dark light absorbing region surrounded by a bright reflective ring was located beneath each droplet indicative of a partially-wetting Cassie state. The approximate sizes of the pinned base of the droplets were found by fitting circles to the dark regions. The magnification factor due to focusing through the nominally spherical droplets was estimated from M=n/(2−n)≈2 (see, Wang, Z., Guo, W., Li, L., Luk'yanchuk, B., Khan, A., Liu, Z., Chen, Z., and Hong, M., 2010, "Optical virtual imaging at 50 nm lateral resolution with a white-light nanoscope," Nature Communications, 2, 218, which is incorporated by reference in its entirety), where a refractive index of n=1.33 was used for water. Image processing of the measurements gave $r_p$=1.09±0.13 μm consistent with the contact angle behavior observed in FIG. 5.

Figure 6E:
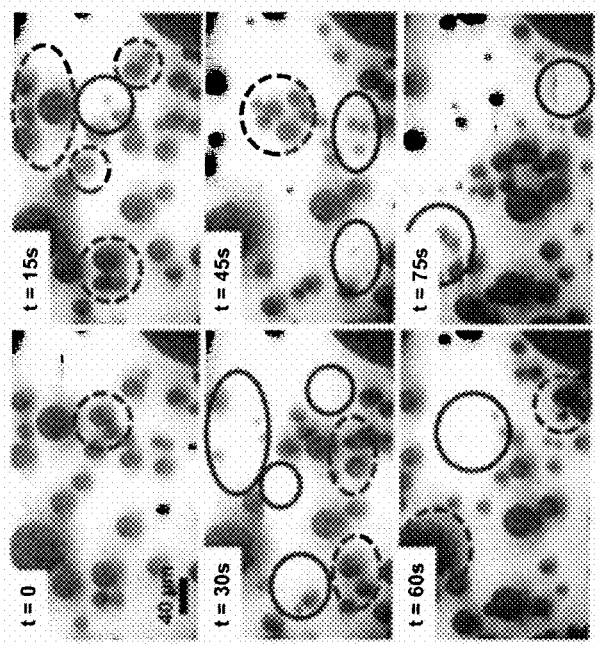
FIG. 6E represents time-lapse images of condensation on the silane-coated CuO surface during ESEM imaging.

In contrast, condensation on the silanated surface at S≈1.5 (FIG. 6C-6D) resulted in a nucleation density of N>5×10$^{10}$ m$^{-2}$ despite the fact that both the thiol and silane molecules are CF$_3$ terminated (i.e., same nominal surface energy). Mixed-mode wetting behavior with pinned droplets on the silanated CuO surface where (L)=0.5N$^{-0.5}$<2.2 μm obtained by focusing at the surface (top, FIG. 6C) and confirmed by focusing through the droplets (below, FIG. 6D) to show the wetting state. This large nucleation density led to the formation of highly pinned droplets that developed irregular shapes following coalescence events (i.e., no coalescence-induced jumping observed). This behavior was in contrast to that observed at lower supersaturations in the ESEM where droplet jumping was observed on the silanated CuO surface, FIG. 6E shows time-lapse images of condensation on the silane-coated CuO surface during ESEM imaging. The dashed and solid circles indicate droplet groups before and after coalescence, respectively (ESEM conditions: $p_v$=800±75 Pa and $T_w$=276±1.5 K (S=1.07±0.1)). Focusing through the droplets (FIG. 5D) showed a number of light absorbing and reflecting regions under the larger droplets formed by coalescence events consistent with a mixed mode wetting state rather than complete wetting. See, Wier, K. A., and Mccarthy, T. J., 2006, "Condensation on ultrahydrophobic surfaces and its effect on droplet mobility: ultrahydrophobic surfaces are not always water repellant," Langmuir, 22(6), pp. 2433-2436, which is incorporated by reference in its entirety.

Distribution of Nucleation Sites

To understand emergent morphology on the functionalized CuO surfaces in the coalescence-dominated growth stage, we first investigated the distribution of nucleation sites on the Au/thiol-functionalized surface. FIG. 7A shows a coordinate map showing the position of the nucleation sites (blue dots) and arrows indicating their nearest neighbor captured using optical microscopy at 100× magnification on the Au/thiol functionalized CuO surface at t=10 s after the start of the experiment ($S \approx 1.5$, $N=3.83 \times 10^9$ m$^{-2}$) (FIG. 6A-6B). FIG. 7B shows the cumulative probability distribution of the nucleated droplet nearest neighbors (red circles) compared to the predictions for a random distribution, $P=1-e^{-N\pi L^2}$ (solid line). The mean separation distance between nucleation sites is given by $2L\sqrt{N}=1$. The horizontal bars represent the bin width. FIG. 7C shows an OM image capturing the distribution of droplet nucleation sites ($S \approx 1.5$, $N=4 \times 10^9$ m$^{-2}$) on the Au/thiol functionalized CuO surface at t=10 s after the start of the experiment. The distribution of nucleation sites from FIG. 7C were analyzed and found to be in good agreement with the Poisson distribution indicating a spatially random nucleation process such that the mean nearest neighbor is given by:

$$\langle L \rangle 0.5 N^{-0.5} \tag{4}$$

See, Gaertner, R. D., *Distribution of active sites in the nucleate boiling of liquids*. Chem. Eng. Prog., 1963. 59: p. 52-61, which is incorporation by reference in its entirety.

However, the observation of nucleation at low supersaturations, $S \leq 1.5$, is inconsistent with kinetic nucleation theory, which predicts a critical supersaturation $S_c > 2.5$ for water condensing on hydrophobic surfaces ($\theta > 90°$). See, Kashchiev, D., *Nucleation: Basic Theory with Applications*. 1 ed. 2000, Oxford: Butterworth-Heinemann., which is incorporated by reference in its entirety. This seeming inconsistency has been linked to randomly-distributed defects in the molecular film coatings used to impart hydrophobicity, which expose the underlying (highly-wettable) substrate creating active nucleation sites. See, Enright, R., et al., *Superhydrophobic condensation: The role of energy barriers and size-scale*. unpublished, 2011, which is incorporated by reference in its entirety. Thus, we attribute the distinctly different condensation behavior observed in FIG. 6 to the defect density associated with the two functionalization methods and the resulting discrepancy in the number of active nucleation sites at $S \approx 1.5$.

Droplet Jumping to Pinning Transition

The transition to a non-jumping mixed-mode wetting state regime can be understood by considering that, as the spacing between nucleation sites L approaches the length scale of the partially-pinned region under a droplet $r_p$, the excess surface energy released during coalescence due to a change in liquid/vapor interfacial area $\Delta A$ at constant volume V is unable to overcome the constant work of adhesion associated with the pinned region under the coalescing droplets. Assuming that complete de-wetting of the liquid from the structured region is energetically unfavorable compared to some portion of the liquid remaining pinned within the structures on the surface, the work of adhesion required to create new interfacial area is $W_1 / \gamma A_p = [(2-\sigma) + \sigma \cos \theta_\gamma] \approx 2$ (for $\sigma \to 0$). To calculate the excess surface energy $\Delta E(\sigma_{app}, R)$ available for droplet jumping we considered the situation shown in FIG. 8A. Two droplets of equal diameter coalesce resulting in the formation of a single jumping droplet. Considering only the volume of liquid not pinned within the structure, the energy balance between states 1 and 2 is given by $$\Delta E = E_2 - E_1 = \gamma \pi [4R^2(\cos \theta_{app}(R)-1) - 4^{1/3} 2^{2/3}(R^3(2+\cos \theta_{app}(R))(\cos \theta_{app}(R)-1)^2)^{2/3}], \tag{5}$$

where $\cos \theta_{app}(R)$ is obtained from Eq. 3. The total work of adhesion W was estimated based on the partially-wetted area under each droplet $A_p$. Neglecting the functionalized CuO contribution to $W_1$ since $\sigma \approx 0$, the work of adhesion for two droplets is then $$W = 2W_1 = 4\gamma A_p. \tag{6}$$

When the magnitudes of $\Delta E$ and W are comparable or when W dominates ($|\Delta E/W| \leq 1$), there is little or no energy available in the system of the two droplets to power jumping. Thus, upon coalescence the newly formed droplet remains on the surface with either one or two wetted regions in the apparent base area, while the remainder of the apparent base area resides in the Cassie state (mixed mode wetting state). However, when $|\Delta E/W| \gg 1$, sufficient excess surface energy is available for conversion into the kinetic energy for droplet jumping, provided that other dissipation mechanism do not play a significant role. See, Boreyko, J. B., and Chen, C.-H., 2009, "Self-propelled dropwise condensate on superhydrophobic surfaces," Phys. Rev. Lett., 103(18), pp. 184501, which is incorporated by reference in its entirety.

Figure 8A:
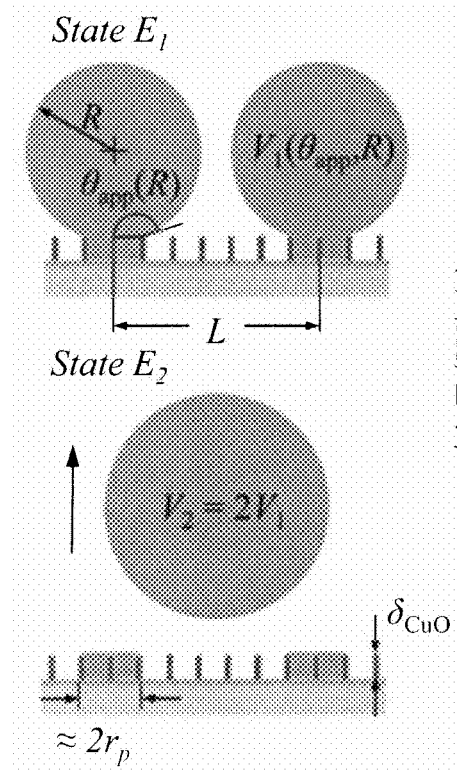
FIGS. 8A-8B represent droplet jumping to pinning transition.
Figure 8B:
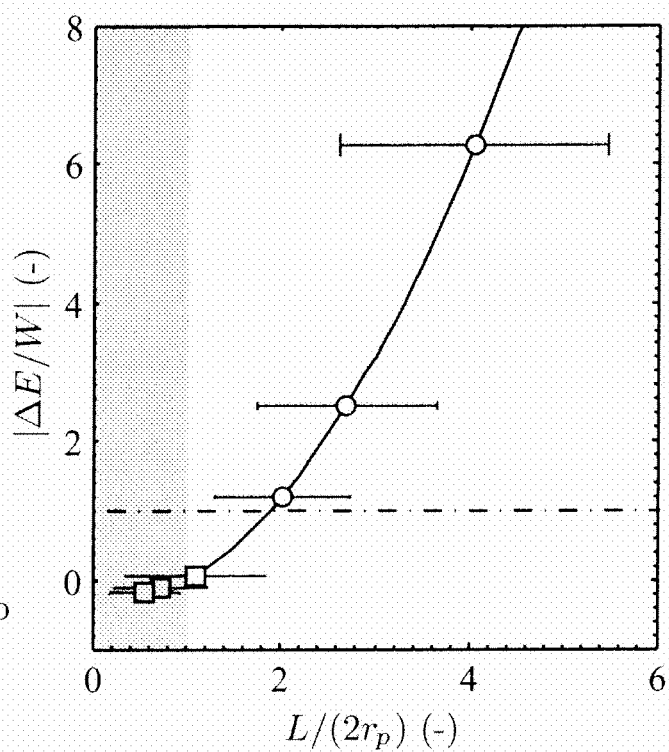

In FIG. 8A, the excess liquid/vapor surface energy was estimated by considering the difference in energy between states $E_1$ and $E_2$. Energy is required to overcome the work of adhesion to form a liquid/vapor interface of area $2A_p$ for the two pinned necks of the coalescing droplets. In FIG. 8B, $|\Delta E/W|$ is plotted as a function of the droplet coalescence length, L=2R, scaled by the characteristic diameter of the pinned region beneath the droplet, $2r_p$, according to to Eqs. 5 and 6. Three values of $r_p$ (=1 µm, 1.5 µm and 2 µm) are shown for each surface. Increasing $r_p$ results in smaller values of $|\Delta E/W|$. We observe that $|\Delta E/W| \sim [L/(2r_p)]^2$. For $r_p=1$ µm, the model predicts $|\Delta E/W|=0.07$ (no jumping) and $|\Delta E/W|=6.27$ (jumping possible) for the silanated CuO ($(L)/(2r_p)=1.1$, blue squares) and thiolated CuO ($\langle L \rangle /(2r_p)=$ 4.05, red circles), respectively, consistent with the observed behavior in FIG. 6. The shaded region ($\langle L \rangle /(2r_p) \leq 1$) marks the transition to the Wenzel state. The horizontal bars for each point show $\pm\sqrt{(L)}$. The large spread in separation distances indicates the possibility of a mixed behavior of droplet jumping and pinning on the same surface. Increasing $r_p$ from 1 µm to 2 µm reduces $|\Delta E/W|$ to $\approx 1.1$ for the Au/thiol surface. For the silane surface, the same increase in $r_p$ results in $(L)/(2r_p)<1$. Based on the observed jumping behavior of the Au/thiol surface and the mixed modes observed on the silane surface, we conclude that the pinned radius is in the range of 1 µm$\leq r_p \leq 1.5$ µm, which is consistent with our optical measurements of the pinned base region.

Individual Droplet Heat Transfer Model

To quantify the heat transfer behavior of individual droplets growing on the nanostructured CuO surface, we used a steady-state heat transfer model that captures the key thermal resistances from the saturated vapor atmosphere in the ESEM to the condensing structured surface for heat transferring through a single droplet. See. Miljkovic et al. (ACS Nano, 2012) and Miljkovic, N., Enright, R., and Wang, E. N., 2012, "Growth dynamics during dropwise condensation on nanostructured superhydrophobic surfaces," Proceedings of the 3rd Micro/Nanoscale Heat & Mass Transfer International Conference, Atlanta, GA, USA, March 3-6, each of which is incorporated by reference in its entirety.

Figures 9A, 9B:
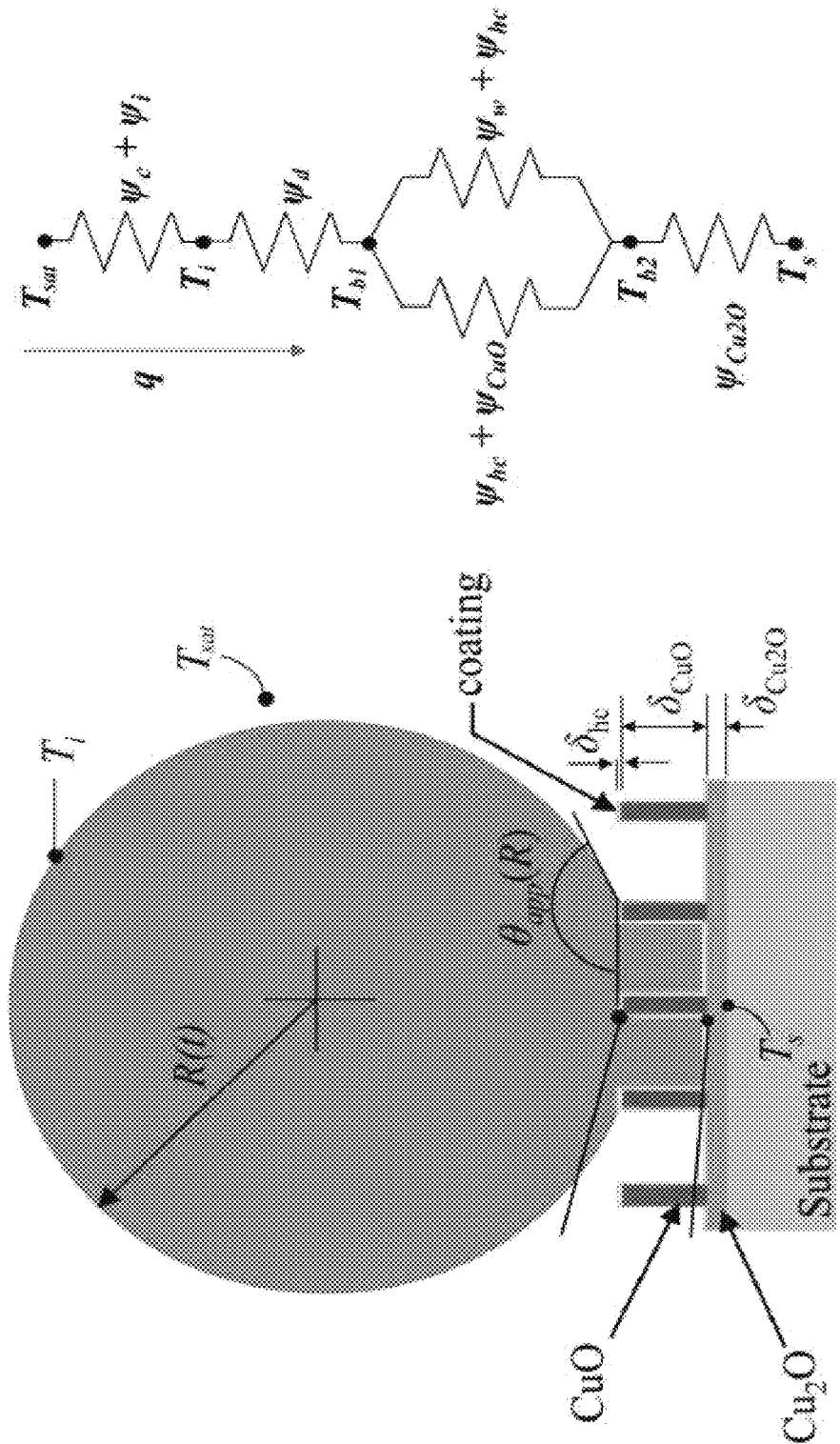
FIGS. 9A-9B represent the individual droplet heat transfer model.

The geometry and thermal resistance network defined in the model in shown in FIG. 9. FIG. 9A shows a schematic diagram of the droplet on the condensing surface growing in the partially-wetting morphology. FIG. 9B shows a droplet thermal resistance diagram showing the droplet curvature ($\psi_c$), liquid-vapor interface ($\psi_i$), droplet conduction ($\psi_d$), hydrophobic coating ($\psi_{hc}$), CuO nanostructure ($\psi_{CuO}$), liquid bridge ($\psi_w$) and Cu$_2$O under layer ($\psi_{Cu2O}$) thermal resistances.

The first resistances encountered as heat is transferred from the saturated vapor to the substrate are those associated with the droplet curvature ($\psi_c$) and liquid-vapor interface ($\psi_i$), which govern the kinetics of the phase change process. The depression of the saturation temperature due to the interface curvature leads to a thermal resistance given by, $$\psi_c = \frac{1}{q}\frac{R_c}{R}(T_{sat} - T_S) = \frac{2T_{sat}\gamma}{Rh_{fg}\rho_w q}, \tag{7}$$

where q is the total heat transfer rate through the droplet, $\gamma$ is the surface tension, $R_c$ is the critical nuclei radius, $T_S$ is the depressed saturation temperature of the vapor near the liquid/vapor interface, $h_{fg}$, is the latent heat and $\rho_w$ is the liquid density. See, Carey, V. P., 2008, *Liquid-Vapor Phase-Change Phenomena*, Taylor & Francis Group, LLC, New York & Oxen, which is incorporated by reference in its entirety.

The thermal resistance between the curvature-depressed saturated vapor and the liquid at the liquid-vapor interface is given by $$\psi_i = [h_i 2\pi R^2(1-\cos\theta_{app})]^{-1} \tag{8}$$

The condensation interfacial heat transfer coefficient $h_i$ is given by $$h_i = \frac{2\alpha}{2-\alpha}(2\pi RT_S)^{-1/2}\left(\frac{h_{lv}^2}{v_{lv}T'_{sat}}\right)\left(1 - \frac{p_v p_{lv}}{2h_{lv}}\right), \tag{9}$$

where R=461.5 J/kg·K and $v_{lv}$, are the specific gas constant and the change in specific volume between the vapor and liquid phases of water, respectively. See, Choi, W., Tuteja, A., Mabry, J. M Cohen, R. E., and Mckinley, G. H., 2009, "A modified Cassie-Baxter relationship to explain contact angle hysteresis and anisotropy on non-wetting textured surfaces," J. Colloid Interface Sci., 339(1), pp. 208-216, which is incorporated by reference in its entirety.

The locally reduced saturation temperature is given by $T_S=T_{sat}-\psi_c q$. The condensation coefficient, $\alpha$, is the ratio of vapor molecules that will be captured by the liquid phase to the total number of vapor molecules reaching the liquid surface (ranging from 0 to 1). We assumed $\alpha$=0.9, which is appropriate for clean environments such as the ESEM (See, Carey, V. P., 2008, *Liquid-Vapor Phase-Change Phenomena*, Taylor & Francis Group, LLC, New York & Oxen, which is incorporated by reference in its entirety.), but in fact the model results were not sensitive to the condensation coefficient ranging from 0.5 to 1 in this study. Eq. 9 is strictly valid for $(q_t^{11}v_v/h_{lv})(2*RT_S)^{1/2} \ll 1$, where $q_t^{11}/h_{lv}$ is the mass flux crossing the liquid/vapor interface. For the range of calculations performed here we found that the maximum $(q_t^{11}v_v/h_{lv})(2*RT_S)^{1/2} \approx 1\times10^{-12}$. The latent heat released during phase change is then conducted through the droplet having a thermal resistance ($\psi_d$) that varies with $\theta_{app}(R)$ (FIG. 5) given by Kim, S., and Kim, K. J., 2011, "Dropwise condensation modeling suitable for superhydrophobic surfaces" J. Heat Transfer, 133(8), pp. 081502-1-081502-7, which is incorporated by reference in its entirety.

$$\psi_d = \frac{\theta_{app}}{4\pi R k_w \sin\theta_{app}}. \tag{10}$$

Heat is then conducted from the apparent base of the droplet through the nanostructured region to the substrate through thermal resistances due to the hydrophobic coating ($\psi_{hc}$), the nanostructures ($\psi_{CuO}$), the area of pinned liquid underneath the droplet ($\psi_w$), and the underlying oxide ($\psi_{Cu2O}$). By approximating this composite region as a parallel heat transfer pathway from the apparent base of the droplet to the substrate surface we obtain $$\left[\frac{1}{(\psi_{hc}+\psi_{CuO})} + \frac{1}{(\psi_w+\psi_{hc})}\right]^{-1} = \tag{11}$$
$$\left[\pi R^2 k_{hc}\sin^2\theta_{app}\left(\frac{k_{CuO}\varphi}{\delta_{hc}k_{CuO}+\delta_{CuO}k_{hc}} + \frac{k_w(1-\varphi)}{\delta_{hc}k_w+\delta_{CuO}k_{hc}}\right)\right]^{-1}$$

where $k_w$ is the thermal conductivity of water, $k_{hc}$ is the thermal conductivity of the functional coating ($\approx 0.2$ W/m·K for a molecular monolayer) and $\delta_{hc}$ is the functional coating thickness ($\approx 1$ nm). Finally, the thermal resistance of the Cu$_2$O layer is given by $$\psi_{Cu2O} = \frac{\delta_{Cu2O}}{\pi R^2 \sin^2\theta_{app} k_{Cu2O}}. \tag{12}$$

After summing Eqs. 7, 8, 10, 12 and rearranging, the heat transfer rate is $$q = \frac{\pi R\left(\Delta T - \frac{2T_{sat}\gamma}{Rh_{lv}\rho_l}\right)}{h_{lv}\rho_l\left(\begin{bmatrix}[2h_i(1-\cos\theta_{app})]^{-1} + \frac{\theta_{app}R}{4k_l\sin\theta_{app}} + \\ \left[k_{hc}\sin^2\theta_{app}\left(\frac{k_{CuO}\varphi}{\delta_{hc}k_{CuO}+\delta_{CuO}k_{hc}} + \frac{k_l(1-\varphi)}{\delta_{hc}k_l+\delta_{CuO}k_{hc}}\right)\right]^{-1} + \frac{\delta_{Cu2O}}{\sin^2\theta_{app}k_{Cu2O}}\end{bmatrix}\right)}, \tag{13}$$

where $\Delta T$ is the temperature difference between the saturated vapor and the substrate temperature underneath the Cu$_2$O layer. The droplet heat transfer rate is then related to the droplet growth rate dR/dt by $$q(R) = \tag{14}$$
$$\dot{m}h_{lv} = \rho_l h_{lv}\frac{dV}{dt} = \pi\rho_l h_{lv}\frac{d}{dt}\left[(1-\cos\theta_{app}(R))^2(2+\cos\theta_{app}(R))R^3\right].$$

In this formulation, the apparent contact angle can be defined as a function of the drop radius as given by Eq. 3. See, Miljkovic, N., Enright, R., and Wang, E. N., 2012, "Modeling and optimization of condensation heat transfer on micro and nanostructured superhydrophobic surfaces," J. Heat Transfer, accepted, which is incorporated by reference in its entirety.

Equating Eqs. 13 and 14, an expression for the droplet growth rate is obtained that is solved numerically to determine the droplet radius as a function of time. See, Miljkovic et al. (ACS Nano, 2012). To obtain sufficient accuracy and resolution, the time step used in the numerical simulation was $\Delta t=0.01$ s. Material properties were obtained using NIST software (REFPROP) such that all input parameters used were temperature dependent. See, Lemmon, E. W., Mclinden, M. O., and Friend, D. G., 2005, NIST Chemistry WebBook, NIST Standard Reference Database Number 69, National Institute of Standards and Technology, Thermophysical properties of fluid systems, which is incorporated by reference in its entirety.

Model Prediction of Individual Drop Growth Rates

Figure 10A:
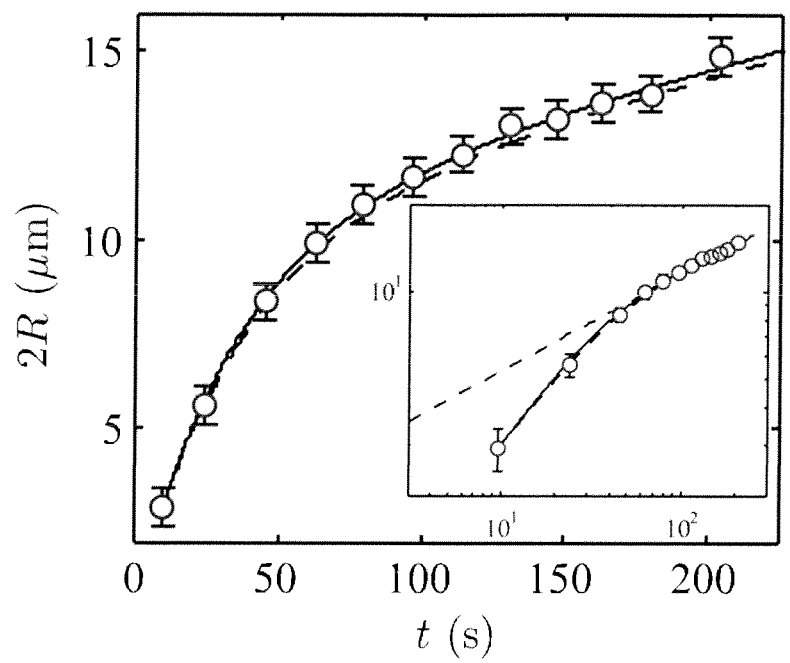
FIGS. 10A-10B represent a series of graphs showing a model prediction of individual drop growth rates averaged for 12 individual droplets.

In FIG. 10A, the measured droplet radii as a function of time for 12 individual droplets were compared to the predictions of the heat transfer model described above. The experimentally measured droplet diameters as a function of time (red circles) are compared to the individual droplet growth model (solid curve) with $r_p=1.5$ μm, $\delta_{CuO}=1.5$ μm (ESEM conditions: $p_v=800\pm75$ Pa and $T_w=276\pm1.5$ K (S=1.07±0.1)). The inset shows the experimental data, the model predictions and a fitted $R \propto t^{1/3}$ scaling (dashed curve) in log coordinates. The error bars correspond to uncertainty in the measured droplet radius. The data was best fit by $\Delta T=0.034$ K, which is within the uncertainty of the measurements of temperature and pressure in the ESEM chamber. This value was chosen based on the best fit between the model and experimental growth rate data. The results of the observed behavior compare well to the classic power law growth model for condensation. See, Fritter, D., Knobler, C. M., and Beysens, D. A., 1991, "Experiments and simulations of the growth of droplets on a surface (breath figures)," Phys. Rev. A, 43(6), pp. 2858-2869, which is incorporated by reference in its entirety.

When droplet dimensions are larger than the pinned region (R≥2 μm), we expect the droplet radius to follow a power law over time $R=At^b$, where A is a constant, t is time and b, the power law exponent, ranges from 0 to 1 depending on the substrate dimensionality and growth limiting mechanism. During initial growth without coalescence (R<4 μm), the power law exponent of b=¾ could be reasonably fitted to the data. This value was within the range of 0 to 1, but differs from b=⅓ expected for diffusion limited growth. This result indicates that a diffusion process was not the major limiting growth mechanism. However, at long times the b=⅓ growth exponent was recovered, coinciding with diffusion limited growth due to conduction through the droplet bulk.

Figure 10B:
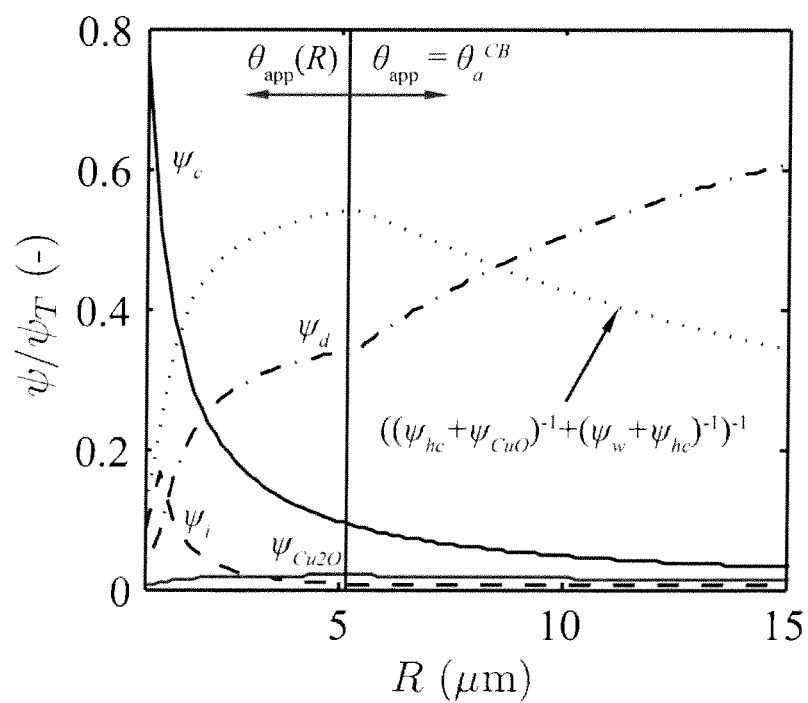

FIG. 10B gives a breakdown of the component thermal resistances normalized to the total thermal resistance predicted by the model during droplet growth. The vertical line delineates the transition from radius-dependant apparent contact angle ($\theta_{app}(R)$) to a fixed contact angle equal to the macroscopically measured apparent advancing contact angle ($\theta_a^{CB}$) at 2R=11 μm.

The model predicts that at small droplet radii (R≤3 μm), growth rates were limited by the combination of the conduction resistance of the droplet volume pinned within the nanostructures $(((\psi_{hc}+\psi_{CuO})^{-1}+(\psi_w+\psi_{hc})^{-1})^{-1})$ and the interface curvature resistance ($\psi_c$) that effectively reduces the driving pressure difference for vapor molecules attaching to the liquid-vapor interface. The interfacial resistance (p) was found to contribute little to the total resistance, peaking at $\psi_i/\psi_T=0.17$ for R=0.95 μm before dropping off to $\psi_i/\psi_T<0.01$ at larger radii. Similarly, the Cu$_2$O layer ($\psi_{Cu2O}$) beneath the CuO nanostructures also contributed negligibly to the total thermal resistance, $\psi_{Cu2O}/\psi_T \approx 0.02$. Beyond R>8 μm, the heat transfer process was increasingly limited by the conduction resistance within the droplet bulk. See, Miljkovic et al. (ACS Nano, 2012).

Droplet Number Density as a Function of Droplet Diameter

Figure 11:
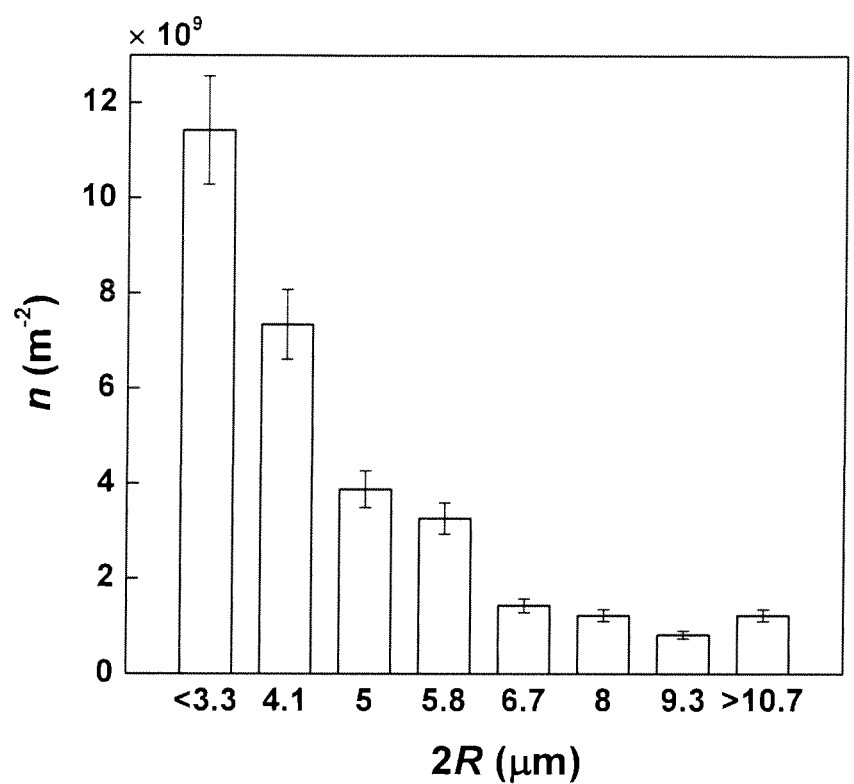
FIG. 11 represents a graph showing a droplet number density as a function of droplet diameter for steady-state condensation.

To discern the mean coalescence length for condensed droplets on the CuO nanostructure, the droplet size distribution was measured from the ESEM images. Droplet number density and size were measured from multiple images of the steady-state condensation process over several cycles of droplet growth, coalescence-induced jumping and re-growth for ESEM conditions: $p_v=800\pm75$ Pa, $T_w=276\pm1.5$ K, S=1.07±0.1 (ImageJ and Adobe Photoshop), accounting for inclination angle and total frame size (FIG. 11). The counting error associated with the droplet number density was estimated to be ~10% at each size range.

Due to a nucleation density of $N \approx 1 \times 10^{10}$ m$^{-2}$, the mean center-to-center spacing of the droplets was ~5 μm and coalescence-induced jumping (see, Boreyko, J. B. and C.-H. Chen, *Self-Propelled Dropwise Condensate on Superhydrophobic Surfaces*. Physical Review Letters, 2009. 103(18): p. 184501, which is incorporated by reference in its entirety) maintained a majority portion of the droplet distribution below 10 μm as shown in FIG. 11.

Heat Transfer Performance of the CuO Surface

To predict the heat transfer performance of the CuO surface, the observed growth behavior was incorporated into a recently developed model. The steady state condensation heat flux was first estimated by modeling the heat transfer rate through an individual drop. Heat is transferred from the saturated vapor to the liquid-vapor interface through resistances associated with droplet curvature ($r_c$) and liquid-vapor interface ($r_i$). The heat is conducted through the droplet and the nanostructures to the substrate through thermal resistances due to conduction through the droplet that incorporates the contact angle behavior as a function of droplet size (FIG. 4) ($r_d$), the hydrophobic coating ($r_{hc}$), the nanostructures and underlying oxide ($r_n$) and the area of pinned liquid underneath the droplet ($r_g$). The single drop behavior was then multiplied by the droplet size distribution and integrated over all radii given by:

$$q''=\int_{R}^{*R_{eff}} q(R)n(R)dR + \int_{R_{eff}}^{R_{max}} q(R)N(R)dR. \quad (15)$$

Figure 12:
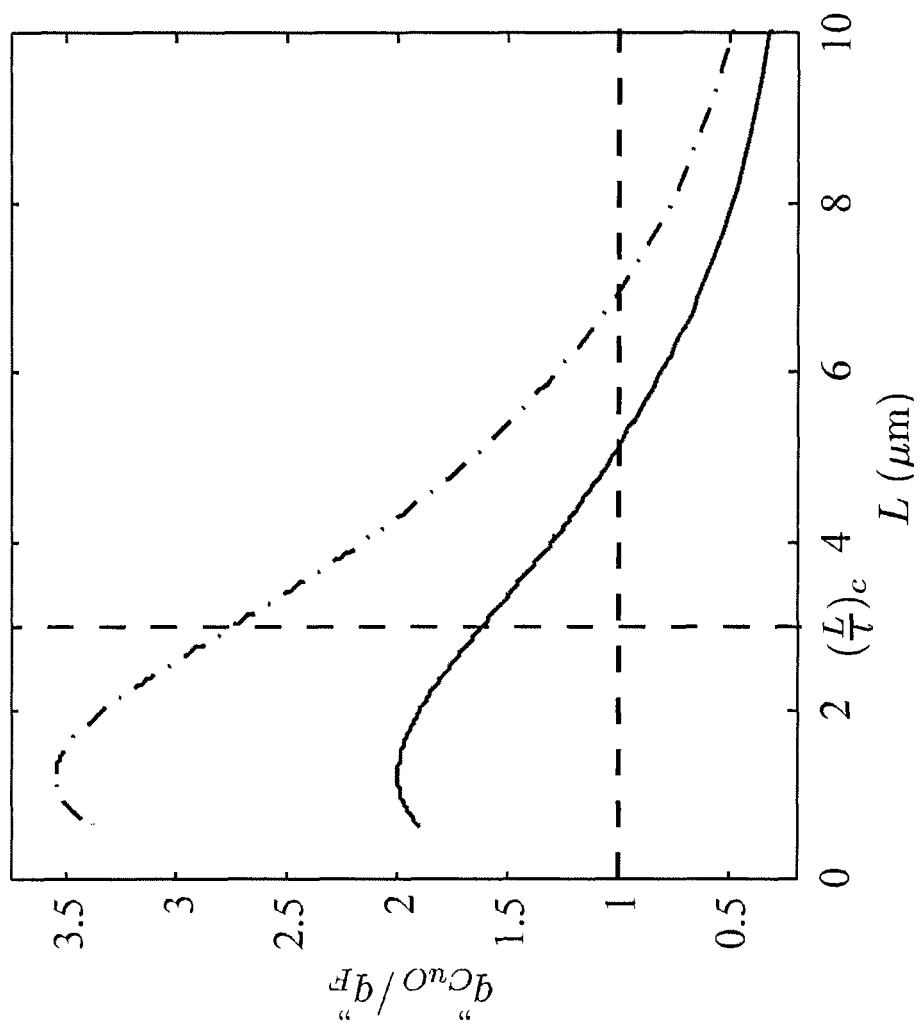
FIG. 12 represents a graph showing a heat flux ratio as a function of droplet coalescence length in comparison to a smooth hydrophobic surface.

Eq. 15 was used to compare the heat flux performance for the CuO surface to a corresponding smooth thiolated surface with a contact angle corresponding to the advancing angle ($\theta_a=120°$). The droplet coalescence length L was set equal to the effective radius $R_{eff}$ and varied by changing nucleation density according to Eq. 4. To make a conservative comparison of performance, the nucleation density for both surfaces was assumed to be equal. For the flat surface a fixed departure size, R=2 mm, was assumed. The departure size for the CuO surface was equated to L assuming ideal coalescence-induced jumping behavior, i.e., inviscid limit with no influence of variable contact angle. FIG. 12 demonstrates that, for L>5 μm, the CuO surface degrades heat transfer performance in comparison to the smooth surface. A 2× peak is observed at L≈2 μm, but performance drops for smaller L as the curvature resistance begins to play a significant role. However, for the CB state to arise it is necessary to remain above the critical L/l, which limits the maximum enhancement to ~1.6× at L≈3 µm.

The predicted behavior can be explained in terms of the key thermal resistances. During early stages of growth (R≤6 µm), the conduction resistance ($r_d$) through the droplet is negligible compared to the other thermal resistances. Therefore, for a droplet on the CuO surface, the nanostructure ($r_n+r_{hc}$) and liquid bridge ($r_g+r_{hc}$) resistances are dominant. However, for R≥6 µm the performance is limited by the large apparent contact angle of droplets on the CuO surface, which causes significant thermal resistance due to the limited droplet basal contact area. This can be seen in FIG. 12 where the effect of reducing the nanostructure height was explored while assuming identical contact angle behavior. The peak enhancement is observed to increase to ~3.5× (or ~2.75× to remain above the critical L/l ratio), but the maximum "break-even" coalescence length does not change to a great extent, increasing from ~5 µm to ~7 µm.

Overall Heat Transfer Behavior

To estimate the overall heat transfer performance of the nanostructured CuO surface, the individual droplet growth behavior was incorporated into an expression for the droplet size distribution and integrating over all radii given by $$q''=\int_{R_c}^{(L)/2} q(R)n(R)dR + \int_{(L)/2}^{R_{max}} q(R)N(R)dR. \quad (16)$$

where q" is the overall steady-state condensation heat transfer rate per unit area of the condensing surface, (L)/2 is the mean droplet coalescence radius, q(R) is the individual droplet heat transfer (Eq. 14), n(R) is the non-interacting droplet size distribution, N(R) is the coalescence dominated droplet size distribution and $R_{max}$ is the droplet departure size. The first integral in Eq. 16 primarily captures the heat flux due to individual droplet growth before coalescence, but also accounts for the role of droplet sweeping via n(R). The second integral captures the additional heat flux due to droplet coalescence and sweeping.

Figure 13A:
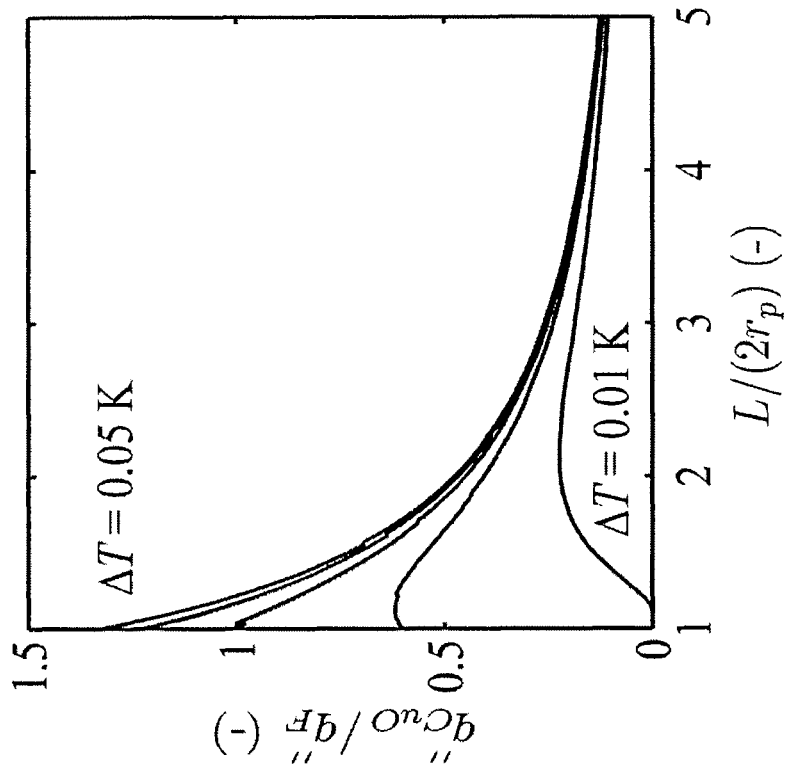
FIGS. 13A-13D represent a series of graphs showing the overall heat transfer behavior.

In FIG. 13A, the heat flux ratio is plotted as a function of a unique coalescence length scaled by the pinned base diameter of the droplet for the cases where $r_p$=1 µm, 1.5 µm and 2 µm. Thus, the minimum allowable L corresponds to $L/2r_p$=1 for the three cases. FIG. 13 demonstrates that for $r_p$=1 µm, the CuO surface degrades heat transfer performance in comparison to the smooth surface over the entire range of allowable coalescence lengths. For $r_p$=1.5-2 µm, $q_{CuO}/q_F$=1.13-1.25 at $L/(2r_p)$=1, but drops off steadily as L increases. This behavior is compared to a hypothetical surface with the CuO structure height reduced to $\delta_{CuO}$=100 nm. Here we see that the heat transfer behavior is enhanced at $L/(2r_p)$=1 for the three values of $r_p$ modeled, ranging from 1.16≤$q_{CuO}/q_F$≤1.87. This result highlights the important role of the parasitic thermal resistance associated with the height of the structures. The inset of FIG. 13A shows the predicted behavior for the three pinned regions sizes for the average spacing identified in FIG. 11, (L)=4.42 µm. The model predicts $q_{CuO}/q_F$=0.37, 0.7 and 1.11 for $r_p$=1 µm, 1.5 µm and 2 µm, respectively.

The predicted behavior in FIG. 13A is a direct result of the dominant thermal resistances as a function of droplet size for the CuO nanostructured surface ($\delta_{CuO}$=1.5 µm) compared to a smooth hydrophobic surface for $r_p$=1 µm, 1.5 µm and 2 µm (solid curves). The CuO surface shows an enhancement for $L/(2r_p)$→1 and $r_p$≤1.5 µm. This behavior is compared to similar, hypothetical surface with the CuO height reduced to $\delta_{CuO}$=100 nm (dashed curves). The hypothetical surface demonstrates a wider range of enhancement (modeled conditions: ΔT=0.034 K, $p_v$=800 Pa). FIG. 13A inset shows the predicted heat transfer behavior $r_p$=1 µm, 1.5 µm and 2 µm with (L)=4.42 µm. During early stages of growth (R≤6 µm), the conduction resistance ($\psi_d$) through the droplet is relatively small compared to the conduction resistance through the pinned base region and the curvature resistance. This explains the significant effect of reducing the nanostructure height while assuming identical contact angle behavior. Therefore, droplet shedding at these radii isolates a regime of high growth rates (in comparison to the later diffusion limited growth), but can only be accessed in the jumping-droplet regime by reducing the characteristic length-scale of the surface structures. In the diffusion limited growth regime (R≥6 µm), the performance of the nanostructured CuO surface is penalized by the large apparent contact angle of the droplets, which causes significant thermal resistance due to the limited droplet basal contact area in comparison to a droplet on the smooth condensing surface.

Figure 13B:
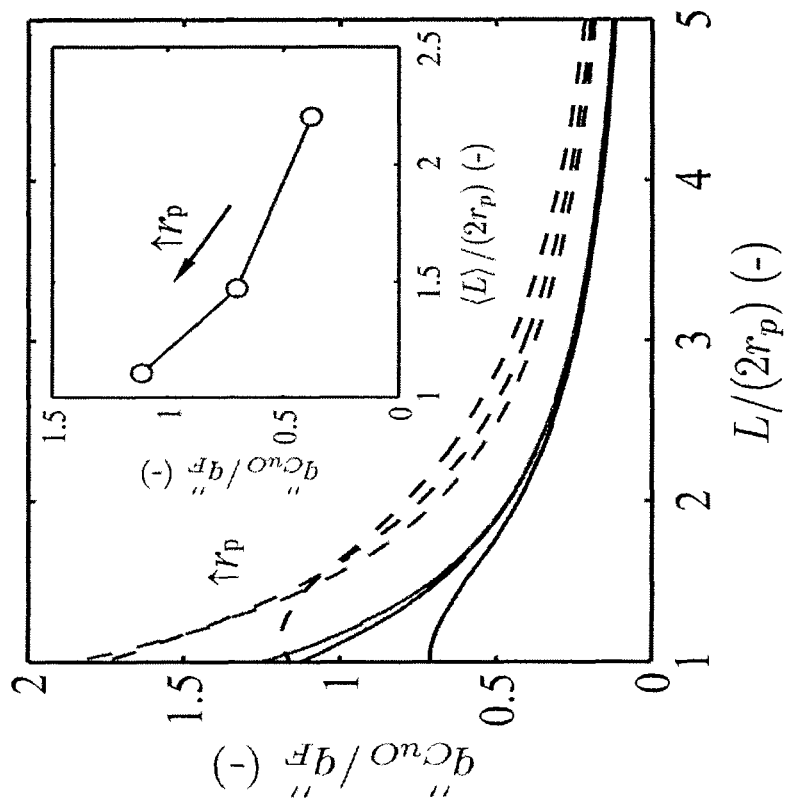
Figure 13D:
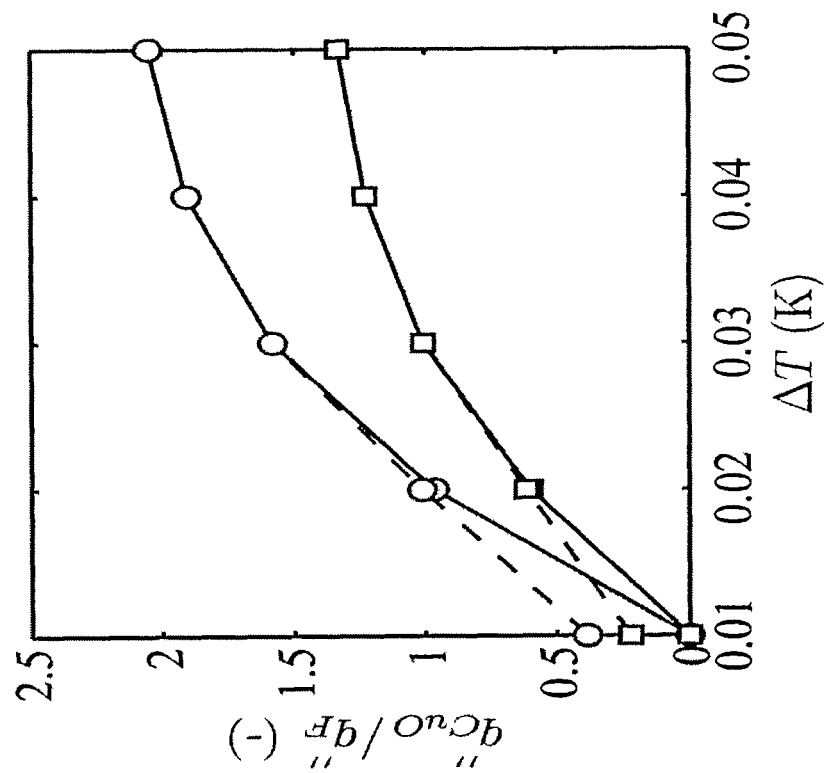
Figure 13C:
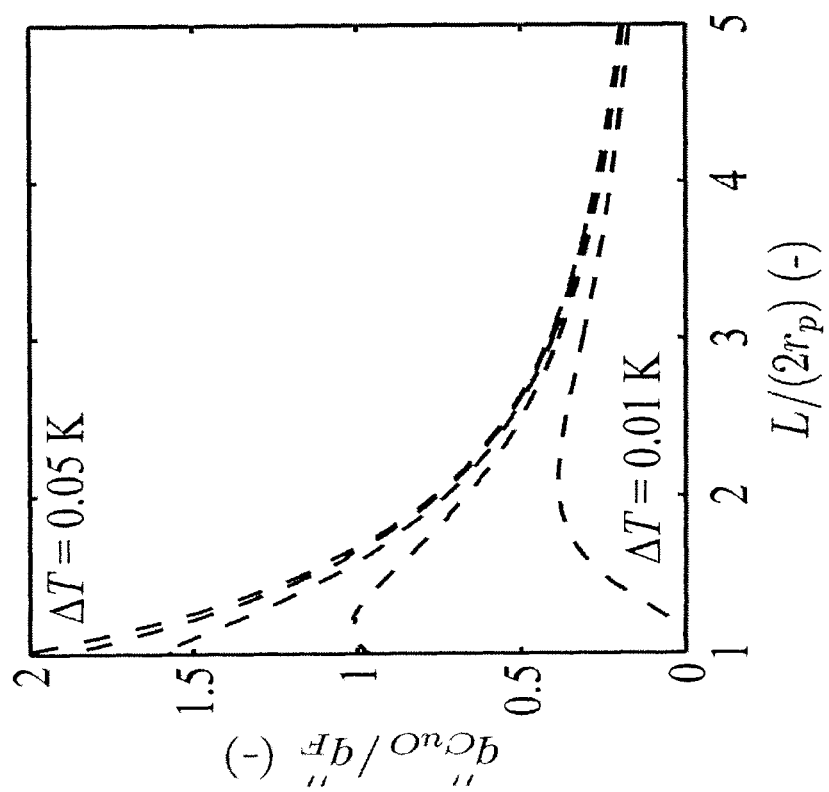

In FIGS. 13B-13C, the heat flux ratio is plotted as a function of $L/(2r_p)$ for $r_p$=1.5 µm and $\delta_{CuO}$=1.5 µm (FIG. 13B) and $\delta_{CuO}$=100 nm (FIG. 13C) with 0.01 K≤ΔT≤0.05 K in steps of 0.01 K with constant $p_v$=800 Pa. FIG. 13D summarizes the results shown in FIGS. 13B-13C. The values of $q_{CuO}''/q_F''$ at $L/(2r_p)$=1 (solid curves) and $|q_{CuO}''/q_F''|_{max}$ (dashed curves) for $\delta_{CuO}$=1.5 µm (blue squares) and $\delta_{CuO}$=100 nm (red circles) obtained from FIG. 13B and FIG. 13C, respectively. We can see that the jumping surface is more strongly affected by the degree of subcooling in comparison to the smooth surface. The strong effect of subcooling can be explained by the fact that jumping droplets grow in size ranges from $R_c$ up to (L)/2(≈1-10 µm) where the curvature resistance is appreciable during the majority of the droplet growth. However, shedding droplets obtain most of their growth and heat transfer at size ranges from $R_c$ up to ≈1 mm) where the curvature resistance is a smaller contribution to the thermal resistance. The result is a heavier penalty paid by jumping droplets, especially at low supersaturations. We observe this behavior in the model by recalling that the heat transfer behavior of a jumping surface is dictated solely by the first integral in Eq. 16, whereas in conventional dropwise condensation the heat transfer behavior is more heavily weighted by the second integral in Eq. 16 and the important role of sweeping during droplet shedding. Thus, the $\Delta T-(2T_{sat}\gamma/Rh_{fg}\rho_l)$ term in Eq. 13 plays a more central role in the heat transfer behavior of jumping droplet condensation surfaces.

Conclusions

A scalable synthesis method for creating unique oxide nanostructures capable of providing sustained superhydrophobic condensation was presented. Spatially random nucleation at low supersaturations (S≤1.5) was observed using OM, suggesting the role of randomly distributed defects in the thiol SAM coating on the nucleation process. Observations of nucleation and growth behavior using ESEM, coupled with a recently developed model of the heat transfer process on superhydrophobic surfaces, suggests that these surfaces may only become advantageous over a smooth hydrophobic surface for coalescence-induced departure sizes below ~5 µm (N≥1×10¹⁰ m⁻²) and for nucleation densities corresponding to $L/(2r_p)$→1 with $r_p$≥1.5 µm, which is due predominantly to the increased resistance associated with the large apparent contact angles demonstrated by drops on the CuO surface and, to a lesser extent, the height of the nanostructures and the assumption of comparable nucleation densities for both the structured and smooth condensing surfaces. This last assumption may be overly conservative given the large roughness of the CuO surface. Indeed, we have recently demonstrated, via macroscopic heat transfer measurements, that these surfaces are capable of providing a 1.25× heat flux enhancement compared to a conventional dropwise condensing surface. See, Miljkovic, N., Enright, R., Nam, Y., Lopez, K., Dou, N., Sack, J., and Wang, E. N., 2012, "Jumping-droplet-enhanced condesation on scalable superhydrophobic nanostructured surfaces," Nano Lett., 10.1021/n1303835c1, which is included by reference in its entirety. Good agreement between the data and the model was obtained by taking the nucleation density on the CuO surface to be three times larger than the corresponding smooth surface. Furthermore, we note that, presently, the overall heat transfer model does not account for the range of droplet separation distances characteristic of a random distribution. This point remains to be addressed in future studies.

By bounding the maximum nucleation density by the critical L/l ratio, a maximum enhancement of ~1.6× has been predicted. In addition to demonstrating the benefits of increased nucleation density and smaller structure length scales, these results suggest that the coalescence-induced jumping mechanism for droplet departure should be studied in more detail to understand the trade-off between efficient shedding and $L/(2r_p)$ ratios as they approach unity, marking the transition to Wenzel behavior for the partial wetting state. This work highlights some of the challenges associated with realizing superhydrophobic surfaces that can enhance condensational heat transfer, but also emphasizes opportunities to engineer condensation behavior at nanometer length scales.

Nomenclature
  A Power law constant [m/s]
  $A_p$ Droplet base pinned area [m$^2$]
  b Power law exponent [–]
  E Surface energy [J]
  ΔE Change in surface energy [J]
  E* Wetting-state energy ratio [–]
  H Spherical segment height [m]
  $h_i$ Interfacial heat transfer coefficient [W/m$^2$·K]
  $h_{fv}$ Latent heat [J/kg]
  k Thermal conductivity [W/m·K]
  l Characteristic structure spacing/pitch [m]
  ⟨L⟩ Mean coalescence (nearest neighbor) length [m]
  L Coalescence (nearest neighbor) length [m]
  M Magnification factor [–]
  N Nucleation density [m$^{-2}$]
  n Droplet number density [m], refractive index [–]
  N(R) Coalescence-dominated droplet size distribution [m$^{-2}$]
  n(R) Non-interacting droplet size distribution [m$^{-2}$]
  P Cumulative probability [–]
  $P_v$ Vapor saturation pressure [Pa]
  $P_w$ Saturation pressure corresponding to [Pa]
  Q Flow rate [L/min]
  q Heat transfer rate [W]
  q" Heat flux [W/m$^2$]
  r Surface roughness[–]
  $r_p$ Droplet pinned base radius [m]
  R Droplet radius [m]
  ℛ Specific gas constant [J/kg·K]
  S Supersaturation ($p_v/p_w$[–]
  t Time [s]
  $T_w$ Wall temperature [K]
  $T_S$ Curvature-depressed vapor temperature [K]
  ΔT Temperature difference between the liquid-vapor interface and the droplet base [K]
  $W_1$ Single droplet work of adhesion [J]
  W Two droplet work of adhesion [J]

Greek Symbols
  α Condensation coefficient [–]
  γ Surface tension [N/m]
  δ Thickness/height [m]
  θ Contact angle, x-ray diffraction angle [°]
  Δθ Contact angle hysteresis [°]
  $ρ_l$ Liquid density [kg/m$^3$]
  τ Sweeping period [s]
  $v_v$ Vapor specific volume [m$^3$/kg]
  $v_{lv}$ Change in specific volume between vapor and liquid phases [m$^3$/kg]
  φ Solid fraction [–]
  ψ Thermal resistance [W/K]

Superscripts
  CB Cassie-Baxter
  W Wenzel

Subscripts
  a Advancing
  app Apparent
  c Curvature, critical
  d Droplet
  e Equilibrium
  eff Effective
  F Flat
  g Pinned liquid region under droplet
  hc Hydrophobic coating
  i Liquid-vapor interface
  max Maximum
  n Nanostructure
  r Receding
  sat Saturation
  T Total
  w Water Acronyms
  ESEM Environmental scanning electron microscope
  NA Numerical aperture
  RH Relative humidity Other embodiments are within the scope of the following claims.

What is claimed is:

1. A superhydrophobic surface comprising:
  a substrate including a substrate metal, wherein the substrate metal is copper;
  an intermediate layer including a first oxide of the substrate metal on a surface of the substrate, wherein the first oxide is $Cu_2O$;
  a plurality of blade-like nanostructures separated from the substrate by the intermediate layer, the plurality of blade-like nanostructures including a second oxide of the substrate metal on the intermediate layer, wherein the second oxide is CuO grown on the $Cu_2O$;
  a metal coating on the plurality of blade-like nanostructures; and
  a surface modifying layer including a fluorinated compound on at least a portion of the metal coating on the plurality of blade-like nanostructures, wherein the surface modifying layer includes a self-assembled monolayer including the fluorinated compound on the metal coating, wherein the plurality of blade-like nanostructures beneath coalescing droplets reduce droplet adhesion to the substrate by minimizing the solid fraction and break symmetry of coalesced droplets, whereby the droplets accelerate and depart perpendicular to the surface, the plurality of blade-like nanostructures having a morphology and a height dimension of ≤10 nm of blade-like morphology that ensures nucleation within the structures and a majority portion of droplet distribution is below 10 μm at supersaturations, S≤1.5.

2. The surface of claim 1, wherein the surface modifying layer includes a thiol on a surface of the nanostructures.

3. The surface of claim 2, wherein the thiol is an alkyl thiol.

4. The surface of claim 3, wherein the alkyl thiol is a fluorinated alkyl thiol.

5. The surface of claim 1, wherein the surface modifying layer includes a silane on a surface of the nanostructures.

6. The surface of claim 5, wherein the silane is an alkyl silane.

7. The surface of claim 6, wherein the alkyl silane is a fluorinated alkyl silane.

8. The surface of claim 1, wherein a ratio of a coalescence length between nearest neighbor nucleation sites to a spacing between nanostructures is 1.6.

* * * * *